United States Patent
Wittke

(10) Patent No.: US 10,335,680 B2
(45) Date of Patent: Jul. 2, 2019

(54) METHODS AND SYSTEMS FOR AN INTERACTIVE MEDIA GUIDANCE GAME

(71) Applicant: Rovi Guides, Inc., San Carlos, CA (US)

(72) Inventor: David Gerald Wittke, Simi Valley, CA (US)

(73) Assignee: Rovi Guides, Inc., San Jose, CA (US)

( * ) Notice: Subject to any disclaimer, the term of this patent is extended or adjusted under 35 U.S.C. 154(b) by 0 days.

(21) Appl. No.: 15/700,334

(22) Filed: Sep. 11, 2017

(65) Prior Publication Data

US 2019/0076737 A1    Mar. 14, 2019

(51) Int. Cl.
| | |
|---|---|
| A63F 9/00 | (2006.01) |
| A63F 13/52 | (2014.01) |
| H04N 21/482 | (2011.01) |
| A63F 13/73 | (2014.01) |
| A63F 13/25 | (2014.01) |
| H04N 21/478 | (2011.01) |

(52) U.S. Cl.
CPC .............. *A63F 13/52* (2014.09); *A63F 13/25* (2014.09); *A63F 13/73* (2014.09); *H04N 21/4781* (2013.01); *H04N 21/4821* (2013.01)

(58) Field of Classification Search
None
See application file for complete search history.

(56) References Cited

U.S. PATENT DOCUMENTS

| | | |
|---|---|---|
| 6,239,794 B1 | 5/2001 | Yuen et al. |
| 6,388,714 B1 | 5/2002 | Schein et al. |
| 6,564,378 B1 | 5/2003 | Satterfield et al. |
| 6,756,997 B1 | 6/2004 | Ward, III |
| 7,165,098 B1 | 1/2007 | Boyer et al. |
| 7,761,892 B2 | 7/2010 | Ellis et al. |
| 8,046,801 B2 | 10/2011 | Ellis et al. |
| 2002/0174430 A1 | 11/2002 | Ellis et al. |
| 2003/0110499 A1 | 6/2003 | Knudson et al. |
| 2005/0251827 A1 | 11/2005 | Ellis et al. |
| 2010/0153885 A1 | 6/2010 | Yates |
| 2011/0074918 A1* | 3/2011 | Klappert .............. G06F 3/0346 348/43 |
| 2018/0152759 A1* | 5/2018 | Miller .................. H04N 21/454 |

* cited by examiner

*Primary Examiner* — Seng Heng Lim
(74) *Attorney, Agent, or Firm* — Haley Guiliano LLP

(57) ABSTRACT

Methods and systems are described herein for providing an interactive media game. Users may find the process of searching for and identifying content to be boring or cumbersome, and may resultantly become disinterested in consuming media. The interactive media game enables user to play a game under various circumstances and is directed to a user's interests in media content. Playing and winning in the interactive media game enables a user to gain access to media that the user is interested in.

20 Claims, 9 Drawing Sheets

METHODS AND SYSTEMS FOR AN INTERACTIVE MEDIA GUIDANCE GAME

BACKGROUND

In conventional systems, users have access to a vast amount of media content. A user may search for content that he or she finds interesting by navigating through numerous pages of content. Oftentimes, a user may find the process of searching to be boring or cumbersome, and may become disinterested in consuming media completely. Some conventional systems solve this problem by enabling a user to play games instead of consuming content. However, those games are usually unrelated to media content that the user finds interesting.

SUMMARY

Accordingly systems and methods are described herein for a media guidance application that enhances a user's desire to consume media that the user may find interesting. For example, a media guidance application may provide an interactive game interface that the user can play under various circumstances. Furthermore, to further enhance the excitement associated with using the media guidance application, the media guidance application may enable a user, as a result of playing the game, to access media that the user is interested in.

For example, the media guidance application may generate for display a game interface so that the user can remain engaged with the media guidance application. The media guidance application may identify content which was previously consumed by the user to include elements from the previously consumed content on a game interface. The media guidance application may retrieve a first viewing history from a first content provider and a second viewing history from a second content provider. For example, the media guidance application may retrieve a first list of media assets requested by the user from the first content provider and a second list of media assets requested by the user from the second content provider. The media guidance application may generate a game interface that includes tiles associated with content that was previously requested by the user from the first content provider and the second content provider (e.g., sources like Netflix®, Hulu®, etc.). By including the media that was previously consumed by the user, the media guidance application may increase a user's interest in playing the game.

The media guidance application may generate for display the game interface by generating a grid including tiles associated with media assets in the first viewing history and second viewing history. The media guidance application may generate for display a game interface which includes a plurality of tiles each arranged in rows and columns of a grid. The media guidance application may populate each of the tiles with metadata of a media asset that is associated with the tile. For example, the media guidance application may generate for display an image associated with a media asset in a tile that corresponds to the media asset. The media guidance application may associate each column of the grid with a specific content provider. For example, the media guidance application may include tiles associated with media assets from the first content provider in a first column of the grid and may include tiles associated with media assets from the second content provider in a second column of the grid. The media guidance application may, upon rendering the grid, generate for display an option to the user to begin playing the game. Specifically, the media guidance application may generate for display an option to modify the tiles displayed in the game interface.

The media guidance application may receive input from the user to commence playback of the game. Specifically, the media guidance application may receive an input from the user to modify the displayed tiles. For example, the media guidance application may receive the input, from a remote control associated with the media guidance application, selecting a displayed option to randomize the tiles that are displayed in the game interface. The media guidance application may determine when a user initiates a game whether an attribute of a first previously consumed media asset from a first source matches an attribute of second previously consumed media from a second source that appear in a same row, column or diagonal.

The media guidance application may determine that the user wins the game when an attribute of a media asset associated with the first tile matches an attribute of a media asset associated with the second tile. For example, the media guidance application may identify a win when an actor appears in the first previously consumed media asset and the second previously consumed media asset. In some instances, the media guidance application may, in response to a user win, provide access to media that has not yet been consumed by the user.

In some aspects, the media guidance application may retrieve a first viewing history identifying a first plurality of media assets requested by a user from a first content provider. For example, the media guidance application may uniquely identify the user of the media guidance application by using a login provided by the user when first accessing the media guidance application. The media guidance application may transmit all or a portion of the user's login information to a server storing a viewing history associated with the user. For example, the media guidance application may transmit the user's login ID to a server associated with a content provider to which the user subscribes. In response to transmitting the login information (e.g., via a network), the media guidance application may be enabled to receive data listing media that was consumed by the user via the content provider.

The media guidance application may retrieve a second viewing history identifying a second plurality of media assets requested by the user from a second content provider. For example, the media guidance application may determine, based on a user profile, that the user subscribes to the second content provider. The media guidance application may retrieve, from the second content provider, a list of media assets that the user had requested from the second content provider. For example, the media guidance application may generate a query, for the user's viewing history, including data identifying the user. The media guidance application may transmit the query to a database associated with the second content provider. The media guidance application may, in response to transmitting the query, receive the second viewing history.

The media guidance application may generate for display tiles arranged in a grid, where each tile in a first column of the grid is associated with a respective media asset of the first plurality of media assets, and where each tile in a second column of the grid is associated with a respective media asset of the second plurality of media assets. For example, the media guidance application may generate for display the game interface on a display device accessible to the media guidance application. For example, the media guidance application may generate tiles in a first and a second column of a grid of tiles in the game interface. The media guidance application may associate the first column with a first content provider and the second column with a second content provider. For example, the media guidance application may generate for display in the first column tiles associated with media assets from the first provider and may generate for display in the second column tiles associated with media assets from the second provider.

In some embodiments, the media guidance application may determine how many tiles to include in the game interface based on a size of a display device associated with the media guidance application. The media guidance application may determine, based on a size of a display area of the display device, a number of tiles for the first column and the second column of the grid such that each tile of the plurality of tiles in the first column and the second column fit in the display area without overlapping. For example, the media guidance application may retrieve a minimum size associated with each of the tiles of the plurality of tiles. Based on the minimum size of the tiles and the size of the display area, the media guidance application may compute a maximum number of tiles that can fit in the display area without overlapping in the display area.

The media guidance application may associate each tile of a plurality of tiles in the grid with a media asset. For example, the media guidance application may retrieve, from the first viewing history, a first media asset that was previously requested by the user. The media guidance application may associate the first media asset with the tile, by, for example, retrieving metadata associated with the first media asset and generating for display a portion of the metadata in the tile (e.g., a movie poster, a television show name).

In some embodiments, the media guidance application may generate for display media assets in the first column that are associated with a first content provider. The media guidance application may select, for each respective tile in the first column, a respective unique media asset from the first plurality of media assets that was most recently accessed by the user. For example, the media guidance application may select a media asset for display in the first column from a plurality of media assets that were requested by the user from the first content provider. Of the media assets that were requested by the user from the first content provider, the media guidance application may select those that were most recently requested by the user (e.g., by comparing a time that the media was requested to a current time).

In some embodiments, the media guidance application may generate for display media assets in the second column that are associated with a second content provider. The media guidance application may select, for each respective tile in the second column, a respective unique media asset from the second plurality of media assets that was most recently accessed by the user. Similar to the selection described above with respect to the first tile, the media guidance application may select a media asset that was most recently requested by the user from the second content provider for the second tile.

The media guidance application may receive user input to modify the displayed tiles. For example, the media guidance application may generate for display a button associated with changing the displayed tiles within the game interface. The media guidance application may detect, for example, an input on a touch screen associated with the media guidance application and may correlate a location of the detected touch input with a location of the button on a display of the touch screen. Based on correlating the location of the detected touch input with a location of the button on the display, the media guidance application may determine that the user has selected the button input to modify the displayed tiles.

The media guidance application may review a value corresponding to a number of times that the user is allowed to modify the displayed plurality of tiles. For example, the media guidance application may track (e.g., using a number of spins in a profile of the user) how many spins a user can take for the game interface. In response to receiving the user input to perform the spin, the media guidance application may determine whether the number of times is greater than zero (e.g., the user has spins remaining in his/her profile). When the number is greater than zero, the media guidance application may modify the displayed plurality of tiles and may decrement the number of times (e.g., reduce the number of spins by 1). When the number is zero, the media guidance application may notify the user he or she does not have any spins remaining by, for example, generating for display a pop up message indicating that there are zero spins remaining and may suggest an activity that the user can perform to gain more spins. For example, the media guidance application may determine that the user can acquire more spins by consuming additional media assets from one of the first and the second content provider and may accordingly suggest consuming media from one of the content providers.

In response to receiving the user input, the media guidance application may generate for display a first tile associated with the first media asset from the first plurality of media assets in the first column of the grid and a second tile associated with the second media asset, from the second plurality of media assets in the second column of the grid. For example, as described above, the media guidance application may associate a first column with a first media content provider and a second column with a second media content provider. The media guidance application may select a first media asset, using a selection algorithm (e.g., a pseudorandom algorithm) from the first plurality of media assets. The media guidance application may select the second media asset using the selection algorithm (or a different selection algorithm, such as selecting the most recently requested media asset) to select the second media asset from the second plurality of media assets.

In some embodiments, the media guidance application may retrieve first metadata associated with the first media asset and second metadata associated with the second media asset. For example, the media guidance application may transmit a first query to a first content provider and a second query to the second content provider to request the first metadata and the second metadata. For example, the media guidance application may receive first metadata listing a plurality of actors in the first media asset, an image associated with the first media asset, etc.

In some embodiments, the media guidance application may generate a first query including a first unique identifier for the first media asset and a second query including a second unique identifier for the second media asset, where the first query and the second query include a request for metadata of the first media asset and the second media asset, respectively. For example, the media guidance application may retrieve from the first viewing history and the second viewing history the first unique identifier and the second unique identifier, respectively. The media guidance application may generate a query including the identifiers and may include a request for the metadata within the query. The media guidance application may identify a first server address for the first content provider and a second server address for the second and based on the identified addressed, may transmit the first query to the first server and the second query to the second server over a network. In response to transmitting the first and the second query, the media guidance application may receive a first response from the first content provider and a second response from the second content provider including the first and the second metadata, respectively. For example, the media guidance application may receive data from the first content provider and data from the second content provider that include respective images associated with the first media asset and the second media asset.

In some embodiments, the media guidance application may retrieve a first plurality of fields from the first metadata and a second plurality of fields from the second metadata. For example, the media guidance application may retrieve, from the data described above, a plurality of fields associated with each of the first media asset and the second media asset. For example, the media guidance application may detect fields in the first metadata such as a listing of actors and actresses, a title of the media asset, artwork associated with the media asset, etc.

The media guidance application may identify metadata fields in the first metadata are that have a corresponding type in the second metadata. The media guidance application may compare a field type for each field in the first plurality of fields with a field type for each field in the second plurality of fields to determine, based on the comparing, a corresponding field for each field in the first plurality of fields that is in the second plurality of fields. For example, the media guidance application may retrieve a plurality of fields, such as an actor field, title field, genre field from the first metadata and the second metadata. The media guidance application may determine which fields in the first metadata correspond to fields in the second metadata. For example, the media guidance application may identify an 'Actor' field in the first metadata which corresponds to an 'Actor' field in the second metadata.

The media guidance application may compare data in each of the first plurality of fields with data in the corresponding field in the second plurality of fields. For example, the media guidance application may compare data in the 'Actor' field of the first metadata with data in the 'Actor' field of the second metadata. For example, the media guidance application may compare a first name in the 'Actor' field of the first metadata with a second name in the 'Actor' field of the second metadata. The media guidance application may determine that the two fields have matching data when the media guidance application determines that the first name matches the second name.

The media guidance application may match the data in the metadata fields to determine whether a field of the first metadata matches a field of the second metadata. The media guidance application may determine, based on comparing the data in each of the first plurality of fields with the data in the corresponding field in the second plurality of fields, whether one or more fields in the second plurality of fields match a corresponding field in the first plurality of fields. For example, as described above, the media guidance application may determine that the first field matches the second field when the first name matches the second name.

In some embodiments, the media guidance application may determine that a field has multiple values associated with the field. The media guidance application may determine that a field of the plurality of fields is associated with the first or the second metadata includes a plurality of values. For example, an actor field of the first metadata may include a plurality of values for each of the actors that are in the first media asset. The media guidance application may determine that the first field matches the second field when each value of the first plurality of values match a value in the second plurality of values. For example, the media guidance application may determine that the two fields match when all of the actors listed in a first field match all of the actors listed in a second field. In some embodiments, the media guidance application may determine that the first field matches the second field when less that all of the values of the first plurality of values matches a value of the second plurality of values. For example, the media guidance application may determine that the first field matches the second field when only one actor of a plurality of actors in the first field matches an actor of a plurality of actors in the second field.

The media guidance application may determine whether the user has won the game based on an amount of fields of the first metadata that match a corresponding field in the second metadata. The media guidance application may determine, based on an amount of fields in the second plurality of fields that match a corresponding field in the first plurality of fields, whether the first media asset matches the second media asset. For example, the media guidance application may determine that the first field matches the second field as described above. The media guidance application may retrieve a threshold minimum number of fields required for determining a match (e.g., match is identified only when more than one field matches). Based on determining that at least the threshold number of fields match, the media guidance application may determine that the first media asset matches the second media asset.

In some embodiments, the media guidance application may weight each metadata fields differently based on how closely it can identify a media asset. The media guidance application may receive a store associated with each of the one or more fields in the second plurality of fields that match a corresponding field in the first plurality of fields, where the score for each of the one or more fields is based on a relevance of the field in describing the first and the second media asset. For example, the media guidance application may determine that a genre field is important (e.g., to a user) in identifying whether two media assets are similar, while a runtime field is not important (e.g., to a user). Accordingly, the media guidance application may assign a higher score to a genre field than to a runtime field. The media guidance application may determine which fields from the first metadata match fields of the second metadata and may sum the scores for the matching fields. Specifically, the media guidance application may compute a total score based on summing each of the scores associated with the one or more fields. For example, the media guidance application may determine that data in both the genre and runtime fields of the first and second metadata match. The media guidance application may add five to the score for identifying the genre match but may add one to the score for identifying the runtime match. The media guidance application may determine that the first media asset matches the second media asset when the total score is greater than a threshold score and may determine that the first media asset does not match the second media asset when the total score is not greater than the threshold score. For example, the media guidance application may determine that two media assets match when the total score associated with the media assets is greater than two. Following from the example above, the media guidance application may determine that the first media asset matches the second media asset because the total score (e.g., five) is greater than the threshold (e.g., two).

In response to determining that the first media asset matches the second media asset, the media guidance application may generate for display an indication that the first media asset matches the second media asset. For example, the media guidance application may generate an alert window identifying data in the first field that matched the data in the second field.

In some embodiments, the media guidance application may generate for display indications of the metadata of the first media asset that matches the metadata of the second media asset. The media guidance application may generate for display data from a field of the first plurality of fields of the first metadata that matches a corresponding field in the second plurality of fields in the first tile and may generate for display data from a field of the second plurality of fields of the second metadata that matches a corresponding field in the first plurality of fields in the second tile. For example, the media guidance application may determine that an actor of the first media asset matches an actor of the second media asset using any of the methods described above. The media guidance application may generate for display in the first tile and the second tile the actor's name.

In response to determining that the first media asset does not match the second media asset, the media guidance application may generate for display an indication that the first media asset does not match the second media asset. For example, the media guidance application may generate an alert window notifying the user that none of the metadata fields of first media asset matched metadata fields of the second media asset.

In some embodiments, the media guidance application may generate for display an option for the user to receive access to media when the user wins the game (e.g., metadata of the first media asset matches metadata of the second media asset). The media guidance application may determine a user's progress in a series of media assets (e.g., a television series) and may grant access to a next unconsumed media asset to the user. The media guidance application may determine, based on the first viewing history and the second viewing history, that the user has requested a sequence of media assets from a media asset series. For example, the media guidance application may analyze the first and the second viewing history to determine whether any media assets are part of a series of media assets. The media guidance application may compare the media assets from the viewing history that are part of a series of media assets to a sequence of media assets in the series. Based on the comparing, the media guidance application may determine what progress the user has made in the sequence of media assets. The media guidance application may compare media assets in the sequence of media assets to media assets in the media asset series to identify a media asset from the media asset series that has not been consumed by the user (e.g., is not in the first or second viewing history). The media guidance application may determine whether to award the unconsumed media asset to the user based on the user not having access to the unconsumed media asset. Specifically, the media guidance application may determine whether the user is restricted from assessing the media asset from the media asset series. For example, the media guidance application may determine that the user is restricted access to the unconsumed media asset when the unconsumed media asset requires a purchase before it may be consumed, or requires a subscription to one of the first or the second content providers.

In some embodiments, the media guidance application may grant access to the media asset when the media guidance application determines that the user is restricted from accessing the unconsumed media asset. Specifically, in response to determining that the user is restricted from accessing the media asset from the media asset series, the media guidance application may grant access to the media asset from the media asset series by way of one of the first content provider and the second content provider. For example, the media guidance application may grant a subscription to the user to one of the first or the second content providers in response to determining that the user has won the game (e.g., metadata from the first media asset matches metadata from the second media asset) and that the user is restricted access to the unconsumed media asset.

In some embodiments, the media guidance application may identify a second unconsumed media asset, from a second series of media assets, that has not been consumed by the user; and may generate an option for the user to select between receiving access to the first unconsumed media asset from the first series or the second unconsumed media asset from the second series. The media guidance application may determine, based on the first viewing history and the second viewing history, that the user has requested a second sequence of media assets from a second media asset series. Similar to the first series, the media guidance application may compare media assets in the second sequence of media assets to media assets in the second media asset series to identify a second media asset from the second media asset series that has not been consumed by the user. For example, the media guidance application may identify media assets from the second viewing history that belong to the second sequence of media assets. The media guidance application may select a second media asset from the second sequence of media assets that has not yet been consumed by the user and may determine whether the user is restricted from accessing the second media asset. For example, the media guidance application may determine whether the user can access the second media asset without requiring an additional subscription or payment to one of the first and the second media content providers. If the media guidance application determines that the user is restricted from accessing the second media asset the media guidance application may generate for display a prompt to allow for the user to select one of the first media asset or the second media asset for winning the game. Specifically, the media guidance application may generate for display an option to receive access to one of the first media asset from the first media asset series and the second media asset from the second media asset series. For example, the media guidance application may generate a window overlaying the game interface allowing for the user to select one of the first or the second media assets.

In some embodiments, the media guidance application may need to satisfy a criterion before the media guidance application can remove the access restriction to the media asset from the media asset series. The media guidance application may generate a query including data identifying the media asset from the media asset series and data uniquely identifying the user. For example, the media guidance application may generate one or more packets for transmission over a network connection including a unique identifier for the media asset and a unique identifier identifying the user. The media guidance application may transmit the one or more packets to the first and the second content providers (e.g., via a network connection) to determine which of the two content providers can provide access to the media asset. The media guidance application may, in response to transmitting the query, receive data identifying a content provider, of the first content provider and the second content provider, that provides access to the media asset from the media asset series and a criterion associated with removing the access restriction to the media asset from the media asset series. For example, the media guidance application may receive one or more packets from the first content provider that that include a criterion, such as a limited amount of time that the user can have access to the media asset. The media guidance application may grant access to the media asset from the media asset series by satisfying the criterion associated with receiving access to the media asset from the media asset series without further user input. For example, the media guidance application may automatically store the media asset in a memory associated with the media guidance application. The media guidance application may store an instruction to delete the media asset on or before the expiration date associated with the criterion. On or before the expiration date, the media guidance application may automatically delete the media asset.

It should be noted the systems and/or methods described above may be applied to, or used in accordance with, other systems, methods and/or apparatuses.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which.

DETAILED DESCRIPTION

Figure 1:
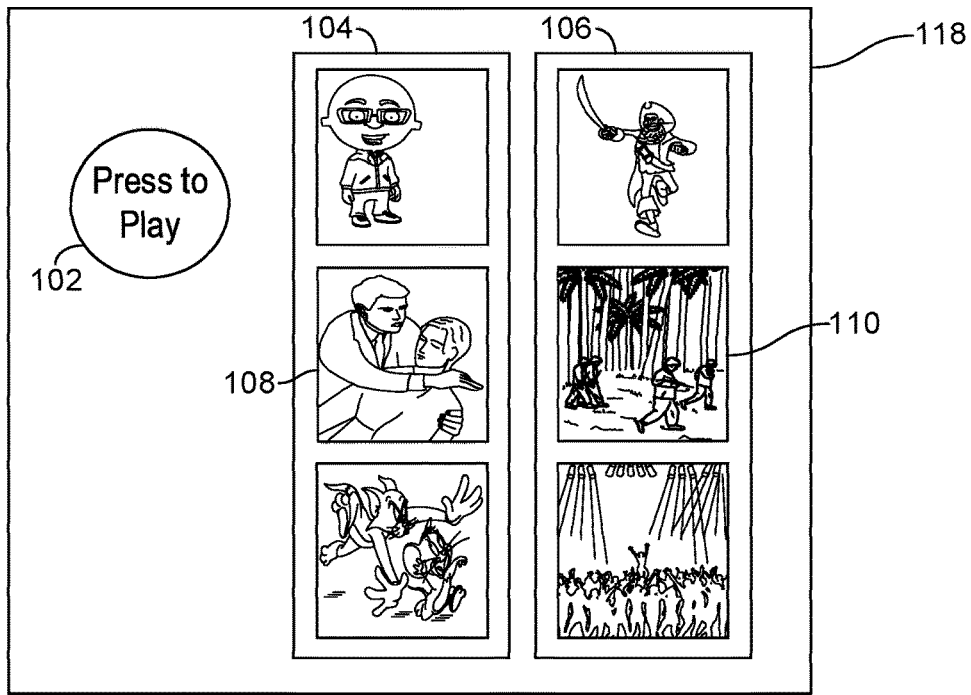
FIG. 1 shows an illustrative embodiment of a display screen including a game interface including a grid of tiles, in accordance with some embodiments of the disclosure.
Figure 1:
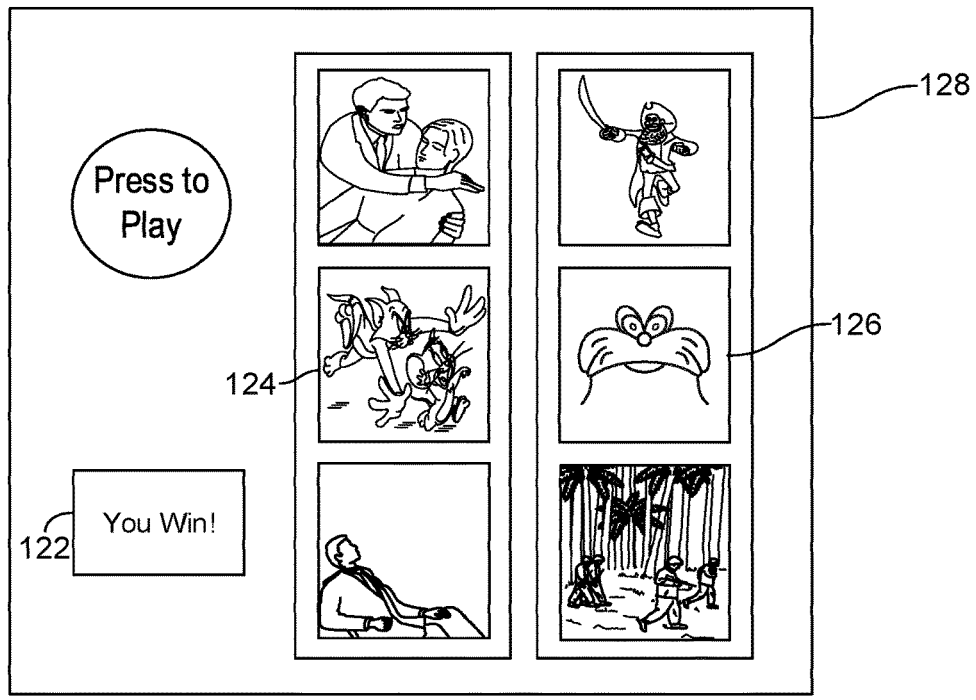

Systems and methods are described herein for a media guidance application that enhances a user's desire to consume media by providing an interactive game interface that the user can play under various circumstances. To further enhance the excitement associated with using the media guidance application, the media guidance application may enable a user, as a result of playing the game, to access media that the user is interested in. For example, the media guidance application may generate for display a game interface so that the user can remain engaged with the media guidance application.

The media guidance application may identify content which was previously consumed by the user to include elements from the previously consumed content in the game interface. By including the media that was previously consumed by the user, the media guidance application may increase a user's interest in playing the game, and thus the user's interest to remain engaged with the media guidance application.

The media guidance application may retrieve a first viewing history from a first content provider including a first list of media assets requested by the user from the first content provider and may retrieve a second viewing history from a second content provider including a second list of media assets requested by the user from the second content provider.

The media guidance application may generate a game interface that includes tiles associated with content that was previously requested by the user from the first content provider and the second content provider (e.g., sources like Netflix®, Hulu®, etc.) in a grid. The media guidance application may generate for display the grid to include a plurality of tiles each arranged in rows and columns, each tile populated with metadata of a media asset from one of the first and the second viewing history. For example, the media guidance application may generate for display a title and description of a media asset in a tile that corresponds to the media asset. The media guidance application may arrange the grid such that each column of the grid is associated with a specific content provider. For example, the media guidance application may identify media assets from the first content provider and generate tiles associated with the identified media assets in the first column of the grid. Similarly, the media guidance application may identify media assets from the second content provider and generate tiles in the second column of the grid that are associated with the media assets from the second content provider.

The media guidance application may prompt a user of the media guidance application to begin playing the game (e.g., modify the tiles displayed in the game interface). In response to receiving input from the user (e.g., via a touch screen associated with the media guidance application), the media guidance application may select a first media asset from the first viewing history for the first tile and may select a second media asset from the second viewing history for the second tile. The media guidance application may determine whether an attribute of the first media asset matches an attribute of the second media asset (e.g., based on comparing metadata of the first media asset and metadata of the second media asset).

The media guidance application may determine that the user wins the game when an attribute of the first media asset (the media asset associated with the first tile) matches an attribute of the second media asset (the media asset associated with the second tile). For example, the media guidance application may determine that the user wins the game when a same actor appears in both the first media asset and in the second media asset. In some instances, the media guidance application may, in response to a user win, provide access to a media asset that has not yet been consumed by the user.

The amount of content available to users in any given content delivery system can be substantial. Consequently, many users desire a form of media guidance through an interface that allows users to efficiently navigate content selections and easily identify content that they may desire. An application that provides such guidance is referred to herein as an interactive media guidance application or, sometimes, a media guidance application or a guidance application.

Interactive media guidance applications may take various forms depending on the content for which they provide guidance. One typical type of media guidance application is an interactive television program guide. Interactive television program guides (sometimes referred to as electronic program guides) are well-known guidance applications that, among other things, allow users to navigate among and locate many types of content or media assets. Interactive media guidance applications may generate graphical user interface screens that enable a user to navigate among, locate and select content. As referred to herein, the terms "media asset" and "content" should be understood to mean an electronically consumable user asset, such as television programming, as well as pay-per-view programs, on-demand programs (as in video-on-demand (VOD) systems), Internet content (e.g., streaming content, downloadable content, Webcasts, etc.), video clips, audio, content information, pictures, rotating images, documents, playlists, websites, articles, books, electronic books, blogs, chat sessions, social media, applications, games, and/or any other media or multimedia and/or combination of the same. Guidance applications also allow users to navigate among and locate content. As referred to herein, the term "multimedia" should be understood to mean content that utilizes at least two different content forms described above, for example, text, audio, images, video, or interactivity content forms. Content may be recorded, played, displayed or accessed by user equipment devices, but can also be part of a live performance.

The media guidance application and/or any instructions for performing any of the embodiments discussed herein may be encoded on computer readable media. Computer readable media includes any media capable of storing data. The computer readable media may be transitory, including, but not limited to, propagating electrical or electromagnetic signals, or may be non-transitory including, but not limited to, volatile and non-volatile computer memory or storage devices such as a hard disk, floppy disk, USB drive, DVD, CD, media cards, register memory, processor caches, Random Access Memory ("RAM"), etc.

With the advent of the Internet, mobile computing, and high-speed wireless networks, users are accessing media on user equipment devices on which they traditionally did not. As referred to herein, the phrase "user equipment device," "user equipment," "user device," "electronic device," "electronic equipment," "media equipment device," or "media device" should be understood to mean any device for accessing the content described above, such as a television, a Smart TV, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a hand-held computer, a stationary telephone, a personal digital assistant (PDA), a mobile telephone, a portable video player, a portable music player, a portable gaming machine, a smart phone, or any other television equipment, computing equipment, or wireless device, and/or combination of the same. In some embodiments, the user equipment device may have a front facing screen and a rear facing screen, multiple front screens, or multiple angled screens. In some embodiments, the user equipment device may have a front facing camera and/or a rear facing camera. On these user equipment devices, users may be able to navigate among and locate the same content available through a television. Consequently, media guidance may be available on these devices, as well. The guidance provided may be for content available only through a television, for content available only through one or more of other types of user equipment devices, or for content available both through a television and one or more of the other types of user equipment devices. The media guidance applications may be provided as on-line applications (i.e., provided on a web-site), or as stand-alone applications or clients on user equipment devices. Various devices and platforms that may implement media guidance applications are described in more detail below.

Figure 2:
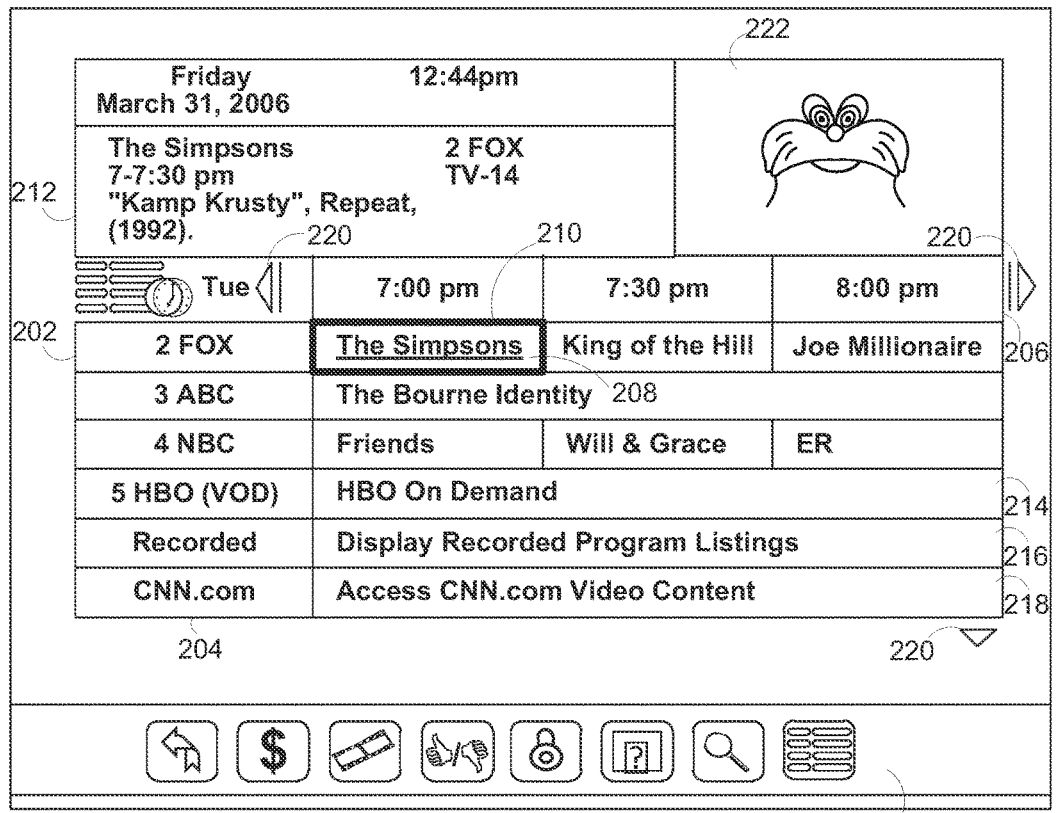
FIG. 2 shows an illustrative example of a media guidance display that may be presented in accordance with some embodiments of the disclosure.
Figure 3:
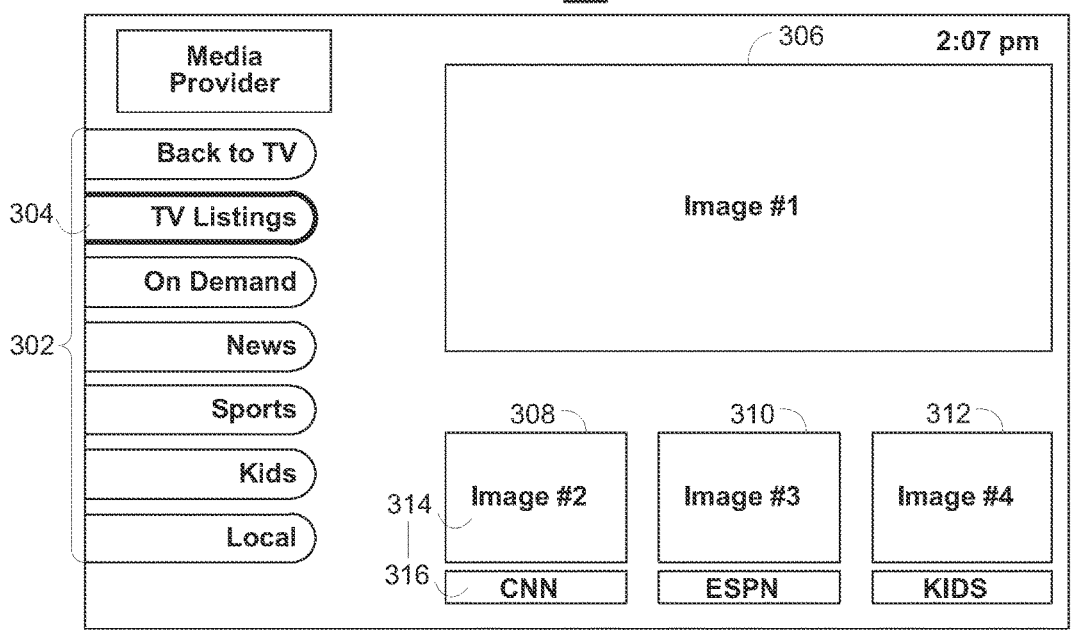
FIG. 3 shows another illustrative example of a media guidance display that may be presented in accordance with some embodiments of the disclosure.

One of the functions of the media guidance application is to provide media guidance data to users. FIGS. 1-3 show illustrative display screens that may be used to provide media guidance, and in particular media listings. The display screens shown in FIGS. 1-3 may be implemented on any suitable device or platform. While the displays of FIGS. 1-3 are illustrated as full screen displays, they may also be fully or partially overlaid over media content being displayed. A user may indicate a desire to access media information by selecting a selectable option provided in a display screen (e.g., a menu option, a listings option, an icon, a hyperlink, etc.) or pressing a dedicated button (e.g., a GUIDE button) on a remote control or other user input interface or device. In response to the user's indication, the media guidance application may provide a display screen with media information organized in one of several ways, such as by time and channel in a grid, by time, by channel, by media type, by category (e.g., movies, sports, news, children, or other categories of programming), or other predefined, user-defined, or other organization criteria.

As referred to herein, the phrase "media guidance data" or "guidance data" should be understood to mean any data related to content or data used in operating the guidance application. For example, the guidance data may include program information, guidance application settings, user preferences, user profile information, media listings, media-related information (e.g., broadcast times, broadcast channels, titles, descriptions, ratings information (e.g., parental control ratings, critic's ratings, etc.), genre or category information, actor information, logo data for broadcasters' or providers' logos, etc.), media format (e.g., standard definition, high definition, 3D, etc.), notification information (e.g., text, images, media clips, etc.), on-demand information, blogs, websites, and any other type of guidance data that is helpful for a user to navigate among and locate desired content selections.

In some embodiments, control circuitry 404, discussed further in relation to FIG. 4 below, executes instructions for a media guidance application stored in memory (i.e., control circuitry 408). Specifically, control circuitry 404 may be instructed by the media guidance application to perform the functions discussed above and below. For example, the media guidance application may provide instructions to control circuitry 404 to generate the media guidance displays discussed in relation to FIG. 1, FIG. 2, and FIG. 3. In some implementations, any action performed by control circuitry 404 may be based on instructions received from the media guidance application.

As referred to herein, the term "in response to" refers to initiated as a result of. For example, a first action being performed in response to a second action may include interstitial steps between the first action and the second action.

As referred to herein, the term "directly in response to" refers to caused by. For example, a first action being performed directly in response to a second action may not include interstitial steps between the first action and the second action.

It will be appreciated that while the discussion of media content has focused on video content, the principles of media guidance can be applied to other types of media content, such as music, images, etc.

FIG. 1 shows an illustrative embodiment of a display screen game interface, in accordance with some embodiments of the disclosure. Display screen 100 is depicted having a grid of tiles, such as first tile 108 and second tile 110.

The media guidance application may associate first tile 108 with a first media asset and may associate second tile 110 with a second media asset. The media guidance application may generate for display in first tile 108 metadata associated with the first media asset and may generate for display in second tile 208 metadata associated with the second media asset. First tile 108 is depicted in a first column of the grid, first column 104. Second tile 110 is depicted in a second column of the grid, second column 106. The media guidance application may generate for display a user input interface, such as button 102, for the user to provide input to the media guidance application to play the game. The media guidance application may generate for display pre-play display 118 before the media guidance application receives an instruction from the user to begin playing the game. The media guidance application may generate for display a different display screen, such as display screen 120 after the user begins playing the interactive media guidance game. For example, the media guidance application may generate for display post-play display 128 after the media guidance application receives a user input to play the game (e.g., via button 102) and determines that the user has won the game. The media guidance application may determine whether the user has won the game when third tile 124 matches a characteristic of fourth tile 126. For example, the media guidance application may determine that a genre of a media asset associated with third tile 124 matches a genre of a media asset associated with fourth tile 126 and may generate for display message 122 indicating to the user that he/she has won the game.

As referred to herein, a "tile" refers to a portion of the game interface that is relevant for gameplay. For example, a tile may be a portion of the game interface that conveys some information to the user, such as an image or text box including information about the game. In some embodiments, a tile may be associated with a media asset. For example, a tile may be a visual representation of a media asset. In some examples, the media guidance application may select a media asset that was previously requested by a user and may generate for display a visual representation of the media asset in the tile. The media guidance application may generate for display a plurality of tiles and may arrange the tiles in a pattern. For example, the media guidance application may generate for display a plurality of tiles arranged in a grid pattern within the game interface. In some embodiments, gameplay includes modification of a visual characteristic of the tile. For example, the media guidance application may detect a user input a requesting modification of a visual characteristic of the tile. The media guidance application may modify the visual characteristic of the tile by identifying a new media asset associated with the tile (e.g., a media asset in one of the first viewing history or the second viewing history) and may generate for display a portion of the metadata for the new media asset in the tile.

In the illustrative example of FIG. 1 the media guidance application may generate for display a game interface including a grid of tiles (including first tile 108 and second tile 110) and a user input interface, such as button 102. The media guidance application may split the grid into two columns, first column 104 and second column 106. The media guidance application may associate first column 104 with a first content provider and may associate second column 106 with a second content provider. In some embodiments, the media guidance application may visually distinguish first column 104 from second column 106 to indicate that tiles in first column 104, such as first tile 108, are associated with the first provider and that tiles in second column 106, such as second tile 110, are associated with the second provider. The media guidance application may generate for display pre-play display 118 before a user has began to play the game and may generate for display post-play display 128 after the user has played the game. For example, the media guidance application may detect a user input (e.g., via button 102) indicating that the user wants to play the game. In response to receiving the user input, the media guidance application may select a first media asset from the first content provider (e.g., the content provider associated with first column 104) and a second media asset from the second content provider (e.g., the content provider associated with second column 106). The media guidance application may generate for display a tile associated with the first media asset, such as third tile 124, and may generate for display a tile associated with the second media asset, such as fourth tile 126. The media guidance application may retrieve first metadata of the first media asset and second metadata of the second media asset and may compare the metadata to determine whether the first media asset matches the second media asset. For example, the media guidance application may compare data in a genre field of the first metadata to data in a genre field of the second metadata. The media guidance application may determine that the first media asset matches the second media asset when the data matches (e.g., both fields have data indicating that the genre is a cartoon). The media guidance application may generate for display a message indicating whether the user has won, such as message 122. For example, the media guidance application may generate for display a message indicating "You Win!" in response to determining that the first media asset matches the second media asset. Exemplary processes for playing a game associated with the game interface depicted in FIG. 1 are described below in detail in relation to FIG. 6-FIG. 11.

In some embodiments, the media guidance application may retrieve a first viewing history identifying a first plurality of media assets requested by a user from a first content provider. For example, the media guidance application may retrieve a profile of a user from a memory. The media guidance application may determine whether a user profile exists by first identifying the user (e.g., login information, a fingerprint for the user, a picture of the user (e.g., gained through a webcam), a hash value of data uniquely identifying the user or any other known identifying information of the user), and then by comparing the user's identity against entries of a user profile database. As a result of the comparison, the media guidance application may receive a pointer to a profile if one is located or may receive a NULL value if the profile does not exist. The user profile database may be located remote or local to the media guidance application. For example, the media guidance application may transmit all or a portion of the user's login information to a server storing a viewing history associated with the user. For example, the media guidance application may transmit the user's login ID to a server associated with a content provider to which the user subscribes. In response to transmitting the login information (e.g., via a network connection), the media guidance application may be enabled to receive data listing media that was consumed by the user via the content provider. The media guidance application may generate an additional query to the content provider to retrieve the viewing history from the database.

The media guidance application may retrieve a second viewing history identifying a second plurality of media assets requested by the user from a second content provider. For example, the media guidance application may identify a user profile for the second content provider as described above with respect to the first content provider. The media guidance application may determine, based on a profile of the user including a user's viewing history for the second content provider. The media guidance application may retrieve, from the second content provider, a list of media assets that the user had requested from the second content provider. For example, the media guidance application may generate a query, for the user's viewing history, including data identifying the user and may transmit the query to a server hosting a database associated with the second content provider. The media guidance application may, in response to transmitting the query, receive the second viewing history. The media guidance application may store the first and the second viewing history in memory during gameplay so that it may be access by the media guidance application without having to re-request the viewing history from the first and second content provider.

The media guidance application may generate for display tiles arranged in a grid, where each tile in a first column of the grid is associated with a respective media asset of the first plurality of media assets, and where each tile in a second column of the grid is associated with a respective media asset of the second plurality of media assets. For example, the media guidance application may generate for display the game interface on a display device accessible to the media guidance application. For example, the media guidance application may generate for display the game interface depicted in FIG. 1. The media guidance application may generate tiles in a first and a second column of a grid of tiles in the game interface. For example, the media guidance application may generate for display tiles, such as first tile 108, second tile 110, third tile 124, and fourth tile 126, on a display screen associated with the media guidance application. The media guidance application may associate each of the tiles with a respective column. For example, the media guidance application may generate for display first tile 108 and third tile 124 in first column 104 when media assets associated with each of first tile 108 and third tile 124 are associated with a first content provider. Similarly, the media guidance application may generate for display second tile 110 and fourth tile 126 in second column 106 when media assets associated with second tile 110 and fourth tile 126 are from a second content provider. The media guidance application may associate the first column with a first content provider and the second column with a second content provider. For example, the media guidance application may associate first column 104 with a first content provider and second column 106 with a second content provider. The media guidance application may generate for display in the first column (e.g., first column 104) tiles associated with media assets from the first provider (e.g., first tile 108 and third tile 124) and may generate for display in the second column (e.g., second column 106) tiles associated with media assets from the second provider (e.g., second tile 110 and fourth tile 126).

In some embodiments, the media guidance application may determine how many tiles to include in the game interface based on a size of a display device associated with the media guidance application. The media guidance application may determine, a size of a display area of the display device by querying the display hardware for a resolution (e.g., in pixels) of the display area. The media guidance application may retrieve, based on a user profile, attributes such as a video scaling preferred by the user. Based on the scaling and on a threshold minimum size for the tile, the media guidance application may identify a size for a single tile in the display area. For example, the media guidance application may determine a size for each of tiles 108, 110, 124 and 126 on the display screen in pixels. Based on the size of the single tile in the display area (e.g., in pixels) and the size of the display area (e.g., also in pixels), the media guidance application may determine a number of tiles that may be generated for display within the display area without overlapping. Specifically, based on a size of a display area of the display device, the media guidance application may determine a number of tiles for the first column and the second column of the grid such that each tile of the plurality of tiles in the first column and the second column fit in the display area without overlapping. For example, the media guidance application may determine a size for first tile 108 and second tile 110 so that first tile 108 does not overlap with second tile 110 in the display area.

The media guidance application may associate each tile of a plurality of tiles (e.g., tiles 108, 110, 124 and 126) in the grid with a media asset. For example, the media guidance application may retrieve, from the first viewing history, a first media asset that was previously requested by the user. The media guidance application may associate the first media asset with a first tile (e.g., first tile 108), by, for example, retrieving metadata associated with the first media asset and generating for display a portion of the metadata in the tile (e.g., a movie poster, a song title, etc.).

In some embodiments, the media guidance application may generate for display media assets in the first column (e.g., first column 104) that are associated with a first content provider. The media guidance application may select, for each respective tile in the first column (e.g., first tile 108 in first column 104), a respective unique media asset from the first plurality of media assets that was most recently accessed by the user. For example, the media guidance application may determine that the each of the media assets in the viewing history includes data identifying a time when the user last requested each media asset. The media guidance application may compare the data identifying the time when the user last requested a media asset to a current time to compute an amount of time since the user has requested the media. The media guidance application may sort media assets of the viewing history based on a respective computed amount of time select a media asset was last requested. For example, the media guidance application may determine that a first media asset was last requested five days ago, and a second media asset was last requested two days ago. Accordingly, the media guidance application may select the second media asset before the first media asset because the second media asset was requested most recently by the user.

In some embodiments, the media guidance application may generate for display media assets in the second column that are associated with a second content provider. For example, the media guidance application may generate for display second tile 110 in second column 106. The media guidance application may select, for each respective tile in the second column (e.g., second tile 110 or fourth tile 126 in second column 106), a respective unique media asset from the second plurality of media assets that was most recently accessed by the user. As described above with respect to the first tile, the media guidance application may select a media asset that was most recently requested by the user from the second content provider for the second tile (e.g., second tile 110).

The media guidance application may receive user input to modify the displayed tiles. For example, the media guidance application may generate for display a button (e.g., button 102) associated with changing the displayed tiles within the game interface. The media guidance application may detect, for example, an input on a touch screen associated with the media guidance application and may correlate a location of the detected touch input with a location of button 102 on a display of the touch screen. For example, the media guidance application may divide the display area into a coordinate axis (e.g., dimensioned based on pixels). The media guidance application may identify which pixels of the display area are associated with button 102. The media guidance application may receive an input (e.g., a mouse input, a touch input from a touch screen, a remote control input selecting button 102, etc.) and may correlate a location of the input to a location of button 102. For example, the media guidance application may determine that the input is associated with location (50, 100). The media guidance application may identify an object which is generated for display at location (50, 100) and, when the media guidance application determines that button 102 is displayed at location (50, 100) may determine that the user has selected button 102. In response to determining that the user has selected button 102, the media guidance application may determine that the user has requested to modify the displayed tiles (e.g., tiles 108 and 110).

In some embodiments, the media guidance application may review a value corresponding to a number of times that the user is allowed to modify the displayed plurality of tiles (e.g., tiles 108 and 110). For example, the media guidance application may track, in a profile of the user, a number of times that the user can modify the displayed tiles. In response to receiving the user input to perform modify the displayed tiles (e.g., tiles 108 and 110), the media guidance application may retrieve the number from the user profile to determine whether the number is greater than zero (e.g., the user has opportunities remaining in his/her profile to modify the displayed tiles, such as tiles 108 and 110). When the number is greater than zero, the media guidance application may modify the displayed plurality of tiles and may decrement the number of times (e.g., reduce the number of times the user may modify the displayed tiles by one). When the number is zero, the media guidance application may notify the user he or she does not have any opportunities to modify the displayed tiles (e.g., tiles 108 and 110) by, for example, generating for display a pop up message indicating that there are zero opportunities remaining and may suggest an activity that the user can perform to gain more opportunities. For example, the media guidance application may determine that the user can acquire more spins by consuming additional media assets from one of the first and the second content provider and may accordingly suggest consuming media from one of the content providers (e.g., a content provider associated with first column 104 or second column 106).

In some embodiments, the media guidance application may determine whether the user has viewed new media based on an updated viewing history from the first and the second content providers (e.g., the first content provider associated with first column 104 and the second content provider associated with second column 106). The media guidance application may transmit a request to receive an updated first viewing history and an updated second viewing history from the first content provider and the second content provider, respectively. In response to receiving the updated first viewing history and the updated second viewing history, the media guidance application may compare the updated viewing histories with the respective viewing histories stored in memory to determine whether the user has consumed any additional media. In some embodiments, the media guidance application may request an update only including any new media assets that were consumed by the user since the last update. For example, the media guidance application may transmit to the first and the second content providers an updated request and a timestamp indicating when a last update was performed. In response to transmitting the query, the media guidance application may receive a list of media assets that were requested by the user after the time of the last update as indicated in the timestamp. When the media guidance application determines that the user has requested new media, the media guidance application may increment a number of times that the user may modify the displayed tiles (e.g., tiles 108 and 110).

In response to receiving the user input, the media guidance application may begin playback of the game by modifying the tiles that are displayed to the user. For example, the media guidance application may modify the display from pre-play display 118 to post-play display 128, which includes a new ordering and/or new media assets associated with tiles within the grid. For example, in response to receiving the user input to modify the displayed tiles (e.g., via button 102), the media guidance application may generate for display a first tile (e.g., third tile 124) associated with the first media asset from the first plurality of media assets in the first column of the grid (e.g., first column 104) and a second tile (e.g., fourth tile 126) associated with the second media asset from the second plurality of media assets in the second column of the grid (e.g., second column 106). The media guidance application may generate for display third tile 124 in location of the display screen previously occupied by first tile 108 and may generate for display fourth tile 126 in a location of the display screen previously occupied by second tile 110. For example, as described above, the media guidance application may associate a first column (e.g., first column 104) with a first media content provider and a second column (e.g., second column 106) with a second media content provider. The media guidance application may select a first media asset, using a selection algorithm (e.g., a pseudorandom algorithm) from the first plurality of media assets. The media guidance application may select the second media asset using the selection algorithm (or a different selection algorithm, such as selecting the most recently requested media asset) to select the second media asset from the second plurality of media assets. A person of ordinary skill in the art would realize that many selection algorithms are possible and the two selection algorithms listed above are merely exemplary.

In some embodiments, the media guidance application may retrieve first metadata associated with the first media asset and second metadata associated with the second media asset. For example, the media guidance application may transmit a first query to a first content provider and a second query to the second content provider to request the first metadata and the second metadata. In another example, the media guidance application may identify a unique identifier for the first media asset and a unique identifier for the second media asset. The media guidance application may transmit a query to an aggregated media guidance data source and may retrieve, from the media guidance data source metadata for the first media asset and for the second media asset. For example, the media guidance application may receive first metadata listing a plurality of actors in the first media asset, an image associated with the first media asset, etc. and may receive second metadata listing a plurality of actors in the second media asset, an image associated with the second media asset, etc.

In some embodiments, the media guidance application may generate a first query including a first unique identifier for the first media asset and a second query including a second unique identifier for the second media asset, where the first query and the second query include a request for metadata of the first media asset and the second media asset, respectively. For example, the media guidance application may retrieve from the first viewing history and the second viewing history the first unique identifier and the second unique identifier, respectively. The media guidance application may generate a query including the identifiers and may include a request for the metadata within the query. The media guidance application may identify a first server address for the first content provider and a second server address for the second and based on the identified addressed, may transmit the first query to the first server and the second query to the second server over a network. In response to transmitting the first and the second query, the media guidance application may receive a first response from the first content provider and a second response from the second content provider including the first and the second metadata, respectively. For example, the media guidance application may receive data from the first content provider and data from the second content provider that include respective images associated with the first media asset and the second media asset. For example, the media guidance application may receive the imaged depicted in tiles 108, 110, 124, and 126 and may generate for display the images within tiles of the grid.

In some embodiments, the media guidance application may retrieve a first plurality of fields from the first metadata and a second plurality of fields from the second metadata. For example, the media guidance application may retrieve, from the data described above, a plurality of fields associated with each of the first media asset and the second media asset. For example, the media guidance application may detect fields in the first metadata such as a listing of actors and actresses, a title of the media asset, artwork associated with the media asset, etc.

The media guidance application may identify metadata fields in the first metadata that have a corresponding type in the second metadata. The media guidance application may compare a field type for each field in the first plurality of fields with a field type for each field in the second plurality of fields to determine, based on the comparing, a corresponding field for each field in the first plurality of fields that is in the second plurality of fields. For example, the media guidance application may retrieve a plurality of fields, such as an actor field, title field, genre field from the first metadata and the second metadata. The media guidance application may determine which fields in the first metadata correspond to fields in the second metadata. For example, the media guidance application may identify an 'Actor' field in the first metadata which corresponds to an 'Actor' field in the second metadata.

The media guidance application may compare data in each of the first plurality of fields with data in the corresponding field in the second plurality of fields. For example, the media guidance application may compare data in the 'Actor' field of the first metadata with data in the 'Actor' field of the second metadata. For example, the media guidance application may compare a first name in the 'Actor' field of the first metadata with a second name in the 'Actor' field of the second metadata. The media guidance application may determine that the two fields have matching data when the media guidance application determines that the first name matches the second name The media guidance application may match the data in the metadata fields to determine whether a field of the first metadata matches a field of the second metadata. The media guidance application may determine, based on comparing the data in each of the first plurality of fields with the data in the corresponding field in the second plurality of fields, whether one or more fields in the second plurality of fields match a corresponding field in the first plurality of fields. For example, as described above, the media guidance application may determine that the first field matches the second field when the first name matches the second name.

In some embodiments, the media guidance application may determine that a field has multiple values associated with the field. The media guidance application may determine that a field of the plurality of fields is associated with the first or the second metadata includes a plurality of values. For example, an actor field of the first metadata may include a plurality of values for each of the actors that are in the first media asset. The media guidance application may determine that the first field matches the second field when each value of the first plurality of values match a value in the second plurality of values. For example, the media guidance application may determine that the two fields match when all of the actors listed in a first field match all of the actors listed in a second field. In some embodiments, the media guidance application may determine that the first field matches the second field when less that all the values of the first plurality of values matches a value of the second plurality of values. For example, the media guidance application may determine that the first field matches the second field when only one actor of a plurality of actors in the first field matches an actor of a plurality of actors in the second field.

The media guidance application may determine whether the user has won the game based on an amount of fields of the first metadata that match a corresponding field in the second metadata. The media guidance application may determine, based on an amount of fields in the second plurality of fields that match a corresponding field in the first plurality of fields, whether the first media asset matches the second media asset. For example, the media guidance application may determine that the first field matches the second field as described above. The media guidance application may retrieve a threshold minimum number of fields required for determining a match (e.g., match is identified only when more than one field matches). Based on determining that at least the threshold number of fields match, the media guidance application may determine that the first media asset (e.g., the media asset associated with third tile 124) matches the second media asset (e.g., the media asset associated with fourth tile 126).

In some embodiments, the media guidance application may weight each metadata fields differently based on how closely it can identify a media asset. The media guidance application may receive a store associated with each of the one or more fields in the second plurality of fields that match a corresponding field in the first plurality of fields, where the score for each of the one or more fields is based on a relevance of the field in describing the first and the second media asset. For example, the media guidance application may determine that a genre field is important (e.g., to a user) in identifying whether two media assets are similar, while a runtime field is not important (e.g., to a user). Accordingly, the media guidance application may assign a higher score to a genre field than to a runtime field. The media guidance application may determine which fields from the first metadata match fields of the second metadata and may sum the scores for the matching fields. Specifically, the media guidance application may compute a total score based on summing each of the scores associated with the one or more fields. For example, the media guidance application may determine that data in both the genre and runtime fields of the first and second metadata match. The media guidance application may add five to the score for identifying the genre match but may add one to the score for identifying the runtime match. The media guidance application may determine that the first media asset matches the second media asset when the total score is greater than a threshold score and may determine that the first media asset does not match the second media asset when the total score is not greater than the threshold score. For example, the media guidance application may determine that two media assets match when the total score associated with the media assets is greater than two. Following from the example above, the media guidance application may determine that the first media asset matches the second media asset because the total score (e.g., five) is greater than the threshold (e.g., two).

In response to determining that the first media asset matches the second media asset, the media guidance application may generate for display an indication that the first media asset matches the second media asset. For example, the media guidance application may generate an alert window identifying data in the first field that matched the data in the second field. For example, the media guidance application may generate for display in post-play display 128 a message, such as message 122 indicating to the user that the user has won. Message 122 and the text included in message 122 is merely illustrative of how the media guidance application may notify a user that he or she has won the game; a person of ordinary skill in the art would realize that there are numerous methods for alerting the user that he/she has won the game. For example, the media guidance application may illuminate a light associated with the media guidance application, may play a sound, may send the user a message to his/her device (e.g., an email message, or a text message to a cell phone of the user), etc.

In some embodiments, the media guidance application may generate for display indications of the metadata of the first media asset that matches the metadata of the second media asset. The media guidance application may generate for display data from a field of the first plurality of fields of the first metadata that matches a corresponding field in the second plurality of fields in the first tile (e.g., second tile 124) and may generate for display data from a field of the second plurality of fields of the second metadata that matches a corresponding field in the first plurality of fields in the second tile (e.g., fourth tile 126). For example, the media guidance application may determine that an actor of the first media asset matches an actor of the second media asset using any of the methods described above. The media guidance application may generate for display in the first tile (e.g., third tile 124) and the second tile (e.g., fourth tile 126) the actor's name. In another example, the media guidance application may retrieve additional data associated with the matching metadata. For example, the media guidance application may determine that the actor matches metadata of the first media asset and the second media asset as described above. The media guidance application may retrieve (e.g., from a metadata server), an image associated with the actor and may generate for display the image of the actor in the first tile (e.g., third tile 124) and the second tile (e.g., fourth tile 126). In an example, the media guidance application may retrieve different images specific to the media asset to which the tile is associated. For example, the media guidance application may retrieve a first image of the actor where he appears in the first media asset and may retrieve a second image of the actor where he appears in the second media asset. The media guidance application may generate for display the first image of the actor in the first tile (e.g., third tile 124) and may generate for display the second image of the actor in the second tile (e.g., fourth tile 126).

In response to determining that the first media asset does not match the second media asset, the media guidance application may generate for display an indication that the first media asset does not match the second media asset. For example, the media guidance application may generate an alert window notifying the user that none of the metadata fields of first media asset matched metadata fields of the second media asset. In an example, when the media guidance application determines that the first media asset does not match the second media asset the media guidance application may generate for display in message 122 text indicating that the user did not win, such as "Sorry, Try Again", instead of the depicted text "You Win!"

In some embodiments, the media guidance application may generate for display an option for the user to receive access to media when the user wins the game (e.g., metadata of the first media asset matches metadata of the second media asset). The media guidance application may determine a user's progress in a series of media assets (e.g., a television series) and may grant access to a next unconsumed media asset to the user. For example, the media guidance application may generate for display in message 122 an option for the user to retrieve additional media. The media guidance application may determine, based on the first viewing history and the second viewing history, that the user has requested a sequence of media assets from a media asset series. For example, the media guidance application may analyze the first and the second viewing history to determine whether any media assets are part of a series of media assets. The media guidance application may compare the assets from the viewing history that are part of a series of media assets to a sequence of media assets in the series. Based on the comparing, the media guidance application may determine what progress the user has made in the sequence of media assets. The media guidance application compare assets in the sequence of media assets to media assets in the media asset series to identify a media asset from the media asset series that has not been consumed by the user (e.g., is not in the first or second viewing history). The media guidance application may determine whether to award the unconsumed media asset to the user based on the user not having access to the unconsumed media asset. Specifically, the media guidance application may determine whether the user is restricted from assessing the media asset from the media asset series. For example, the media guidance application may determine that the user is restricted access to the unconsumed media asset when the unconsumed media asset requires a purchase before it may be consumed, or requires a subscription to one of the first or the second content providers.

In some embodiments, the media guidance application may identify a series that is related to one of the first media asset (e.g., the media asset associated with third tile 124) or the second media asset (e.g., the media asset associated with fourth tile 126). For example, the media guidance application may determine that one of the first media asset or the second media asset are part of a series as described above. When the media guidance application determines that the user wins the game, as described above, the media guidance application may grant access to an additional media asset that is in the series of media assets to which one of the first media asset and the second media asset belong.

In some embodiments, the media guidance application may grant access to the media asset when the media guidance application determines that the user is restricted from accessing the unconsumed media asset. Specifically, in response to determining that the user is restricted from accessing the media asset from the media asset series, the media guidance application may grant access to the media asset from the media asset series by way of one of the first content provider (e.g., the content provider associated with first column 104) and the second content provider (e.g., the content provider associated with second column 106). For example, the media guidance application may grant a subscription to the user to one of the first or the second content providers in response to determining that the user has won the game (e.g., metadata from the first media asset matches metadata from the second media asset) and that the user is restricted access to the unconsumed media asset.

In some embodiments, the media guidance application may identify a second unconsumed media asset, from a second series of media assets, that has not been consumed by the user; and may generate an option for the user to select between receiving access to the first unconsumed media asset from the first series or the second unconsumed media asset from the second series. The media guidance application may determine, based on the first viewing history and the second viewing history, that the user has requested a second sequence of media assets from a second media asset series. As described above with respect to the first series, the media guidance application may compare media assets in the second sequence of media assets to media assets in the second media asset series to identify a second media asset from the second media asset series that has not been consumed by the user. For example, the media guidance application may identify media assets from the second viewing history that belong to the second sequence of media assets. The media guidance application may select a second media asset from the second sequence of media assets that has not yet been consumed by the user and may determine whether the user is restricted from accessing the second media asset. For example, the media guidance application may determine whether the user can access the second media asset without requiring an additional subscription or payment to one of the first and the second media content providers. If the media guidance application determines that the user is restricted from accessing the second media asset the media guidance application may generate for display a prompt to allow for the user to select one of the first media asset or the second media asset for winning the game. For example, the media guidance application may generate for display message 122 along with an indication that the Specifically, the media guidance application may generate for display an option to receive access to one of the first media asset from the first media asset series and the second media asset from the second media asset series. For example, the media guidance application may generate a window overlaying the game interface allowing for the user to select one of the first or the second media assets.

In some embodiments, the media guidance application may need to satisfy a criterion before the media guidance application can remove the access restriction to the media asset from the media asset series. The media guidance application may generate a query including data identifying the media asset from the media asset series and data uniquely identifying the user. For example, the media guidance application may generate a packet for transmission over a network connection including a unique identifier for the media asset and a unique identifier identifying the user. The media guidance application may transmit the packet to the first and the second content provider (e.g., via a network connection) to determine which of the two content providers can provide access to the media asset. The media guidance application may, in response to transmitting the query, receive data identifying a content provider, of the first content provider and the second content provider, that provides access to the media asset from the media asset series and a criterion associated with removing the access restriction to the media asset from the media asset series. For example, the media guidance application may receive a packet from the first content provider that that includes a criterion, such as a limited amount of time that the user can have access to the media asset. The media guidance application may grant access to the media asset from the media asset series by satisfying the criterion associated with receiving access to the media asset from the media asset series without further user input. For example, the media guidance application may automatically store the media asset in a memory associated with the media guidance application. The media guidance application may store an instruction to delete the media asset on or before the expiration date associated with the criterion. On or before the expiration date, the media guidance application may automatically delete the media asset.

The above description of FIG. 1 and the gameplay associated with FIG. 1 is merely illustrative and not limiting. Although the grid depicted in FIG. 1 comprises two columns (first column 104 and second column 106) any number of columns may be included. For example, if three columns are included by the media guidance application, the media guidance application may generate for display third column and may select a third media asset for inclusion in the third column. The media guidance application may identify a "win" when metadata of the first media asset, second media asset, and third media asset match. Additionally, each of the columns are depicted having three tiles, however, this is merely illustrative and any number of tiles can be included in any number of columns. For example, the media guidance application may generate for display in first column 104 and second column 106 a respective set of four tiles each, instead of three, as is presently depicted in FIG. 1. Furthermore, the above disclosure describes matching media assets associated with tiles that are in a same row of the grid. However, any tile from the grid may be selected by the media guidance application to identify a win. For example, the media guidance application may select a tile in the upper rightmost position of the grid and a tile in the lower leftmost position of the grid, and may compare the metadata of the media assets associated with each of the tiles.

FIG. 2 shows illustrative grid program listings display 200 arranged by time and channel that also enables access to different types of media content in a single display. Display 200 may include grid 202 with: (1) a column of channel/media type identifiers 204, where each channel/media type identifier (which is a cell in the column) identifies a different channel or media type available; and (2) a row of time identifiers 206, where each time identifier (which is a cell in the row) identifies a time block of programming. Grid 202 also includes cells of program listings, such as program listing 208, where each listing provides the title of the program provided on the listing's associated channel and time. With a user input device, a user can select program listings by moving highlight region 210. Information relating to the program listing selected by highlight region 210 may be provided in program information region 212. Region 212 may include, for example, the program title, the program description, the time the program is provided (if applicable), the channel the program is on (if applicable), the program's rating, and other desired information.

In addition to providing access to linear programming provided according to a schedule, the media guidance application also provides access to non-linear programming which is not provided according to a schedule. Non-linear programming may include content from different media sources including on-demand media content (e.g., VOD), Internet content (e.g., streaming media, downloadable media, etc.), locally stored media content (e.g., video content stored on a digital video recorder (DVR), digital video disc (DVD), video cassette, compact disc (CD), etc.), or other time-insensitive media content. On-demand content may include both movies and original media content provided by a particular media provider (e.g., HBO On Demand providing "The Sopranos" and "Curb Your Enthusiasm"). HBO ON DEMAND is a service mark owned by Time Warner Company L.P. et al. and THE SOPRANOS and CURB YOUR ENTHUSIASM are trademarks owned by the Home Box Office, Inc. Internet content may include web events, such as a chat session or Webcast, or content available on-demand as streaming media or downloadable media through an Internet web site or other Internet access (e.g. FTP).

Grid 202 may provide listings for non-linear programming including on-demand listing 214, recorded media listing 216, and Internet content listing 218. A display combining listings for content from different types of media sources is sometimes referred to as a "mixed-media" display. The various permutations of the types of listings that may be displayed that are different than display 200 may be based on user selection or guidance application definition (e.g., a display of only recorded and broadcast listings, only on-demand and broadcast listings, etc.). As illustrated, listings 214, 216, and 218 are shown as spanning the entire time block displayed in grid 202 to indicate that selection of these listings may provide access to a display dedicated to on-demand listings, recorded listings, or Internet listings, respectively. In other embodiments, listings for these media types may be included directly in grid 202. Additional listings may be displayed in response to the user selecting one of the navigational icons 220. (Pressing an arrow key on a user input device may affect the display in a similar manner as selecting navigational icons 220.)

Display 200 may also include video region 222, advertisement 224, and options region 226. Video region 222 may allow the user to view and/or preview programs that are currently available, will be available, or were available to the user. The content of video region 222 may correspond to, or be independent from, one of the listings displayed in grid 202. Grid displays including a video region are sometimes referred to as picture-in-guide (PIG) displays. PIG displays and their functionalities are described in greater detail in Satterfield et al. U.S. Pat. No. 6,564,378, issued May 13, 2003 and Yuen et al. U.S. Pat. No. 6,239,794, issued May 29, 2001, which are hereby incorporated by reference herein in their entireties. PIG displays may be included in other media guidance application display screens of the present invention.

Advertisement 224 may provide an advertisement for media content that, depending on a viewer's access rights (e.g., for subscription programming), is currently available for viewing, will be available for viewing in the future, or may never become available for viewing, and may correspond to or be unrelated to one or more of the media listings in grid 202. Advertisement 224 may also be for products or services related or unrelated to the media content displayed in grid 202. Advertisement 224 may be selectable and provide further information about media content, provide information about a product or a service, enable purchasing of media content, a product, or a service, provide media content relating to the advertisement, etc. Advertisement 224 may be targeted based on a user's profile/preferences, monitored user activity, the type of display provided, or on other suitable targeted advertisement bases.

While advertisement 224 is shown as rectangular or banner shaped, advertisements may be provided in any suitable size, shape, and location in a guidance application display. For example, advertisement 224 may be provided as a rectangular shape that is horizontally adjacent to grid 202. This is sometimes referred to as a panel advertisement. In addition, advertisements may be overlaid over media content or a guidance application display or embedded within a display. Advertisements may also include text, images, rotating images, video clips, or other types of media content. Advertisements may be stored in the user equipment with the guidance application, in a database connected to the user equipment, in a remote location (including streaming media servers), or on other storage means or a combination of these locations. Providing advertisements in a media guidance application is discussed in greater detail in, for example, Knudson et al., U.S. patent application Ser. No. 10/347,673, filed Jan. 17, 2003, Ward, III et al. U.S. Pat. No. 6,756,997, issued Jun. 29, 2004, and Schein et al. U.S. Pat. No. 6,388,714, issued May 14, 2002, which are hereby incorporated by reference herein in their entireties. It will be appreciated that advertisements may be included in other media guidance application display screens of the present invention.

Options region 226 may allow the user to access different types of media content, media guidance application displays, and/or media guidance application features. Options region 226 may be part of display 200 (and other display screens of the present invention), or may be invoked by a user by selecting an on-screen option or pressing a dedicated or assignable button on a user input device. The selectable options within options region 226 may concern features related to program listings in grid 202 or may include options available from a main menu display. Features related to program listings may include searching for other air times or ways of receiving a program, recording a program, enabling series recording of a program, setting program and/or channel as a favorite, purchasing a program, or other features. Options available from a main menu display may include search options, VOD options, parental control options, access to various types of listing displays, subscribe to a premium service, edit a user's profile, access a browse overlay, or other options.

The media guidance application may be personalized based on a user's preferences. A personalized media guidance application allows a user to customize displays and features to create a personalized "experience" with the media guidance application. This personalized experience may be created by allowing a user to input these customizations and/or by the media guidance application monitoring user activity to determine various user preferences. Users may access their personalized guidance application by logging in or otherwise identifying themselves to the guidance application. Customization of the media guidance application may be made in accordance with a user profile. The customizations may include varying presentation schemes (e.g., color scheme of displays, font size of text, etc.), aspects of media content listings displayed (e.g., only HDTV programming, user-specified broadcast channels based on favorite channel selections, re-ordering the display of channels, recommended media content, etc.), desired recording features (e.g., recording or series recordings for particular users, recording quality, etc.), parental control settings, and other desired customizations.

The media guidance application may allow a user to provide user profile information or may automatically compile user profile information. The media guidance application may, for example, monitor the media the user accesses and/or other interactions the user may have with the guidance application. Additionally, the media guidance application may obtain all or part of other user profiles that are related to a particular user (e.g., from other web sites on the Internet the user accesses, such as www.tvguide.com, from other media guidance applications the user accesses, from other interactive applications the user accesses, from a handheld device of the user, etc.), and/or obtain information about the user from other sources that the media guidance application may access. As a result, a user can be provided with a unified guidance application experience across the user's different devices. This type of user experience is described in greater detail below in connection with FIG. 5. Additional personalized media guidance application features are described in greater detail in Ellis et al., U.S. patent application Ser. No. 11/179,410, filed Jul. 11, 2005, Boyer et al., U.S. patent application Ser. No. 09/437,304, filed Nov. 9, 1999, and Ellis et al., U.S. patent application Ser. No. 10/105,128, filed Feb. 21, 2002, which are hereby incorporated by reference herein in their entireties.

Another display arrangement for providing media guidance is shown in FIG. 3. Video mosaic display 300 includes selectable options 302 for media content information organized based on media type, genre, and/or other organization criteria. In display 300, television listings option 304 is selected, thus providing listings 306, 308, 310, and 312 as broadcast program listings. Unlike the listings from FIG. 2, the listings in display 300 are not limited to simple text (e.g., the program title) and icons to describe media. Rather, in display 300 the listings may provide graphical images including cover art, still images from the media content, video clip previews, live video from the media content, or other types of media that indicate to a user the media content being described by the listing. Each of the graphical listings may also be accompanied by text to provide further information about the media content associated with the listing. For example, listing 308 may include more than one portion, including media portion 314 and text portion 316. Media portion 314 and/or text portion 316 may be selectable to view video in full-screen or to view program listings related to the video displayed in media portion 314 (e.g., to view listings for the channel that the video is displayed on).

The listings in display 300 are of different sizes (i.e., listing 306 is larger than listings 308, 310, and 312), but if desired, all the listings may be the same size. Listings may be of different sizes or graphically accentuated to indicate degrees of interest to the user or to emphasize certain content, as desired by the media provider or based on user preferences. Various systems and methods for graphically accentuating media listings are discussed in, for example, Yates, U.S. patent application Ser. No. 11/324,202, filed Dec. 29, 2005, which is hereby incorporated by reference herein in its entirety.

Users may access media content and the media guidance application (and its display screens described above and below) from one or more of their user equipment devices. FIG. 4 shows a generalized embodiment of illustrative user equipment device 300. More specific implementations of user equipment devices are discussed below in connection with FIG. 5. User equipment device 400 may receive media content and data via input/output (hereinafter "I/O") path 402. I/O path 402 may provide media content (e.g., broadcast programming, on-demand programming, Internet content, and other video or audio) and data to control circuitry 404, which includes processing circuitry 406 and storage 408. Control circuitry 404 may be used to send and receive commands, requests, and other suitable data using I/O path 402. I/O path 402 may connect control circuitry 404 (and specifically processing circuitry 406) to one or more communications paths (described below). I/O functions may be provided by one or more of these communications paths, but are shown as a single path in FIG. 4 to avoid overcomplicating the drawing.

Control circuitry 404 may be based on any suitable processing circuitry 406 such as processing circuitry based on one or more microprocessors, microcontrollers, digital signal processors, programmable logic devices, etc. In some embodiments, control circuitry 404 executes instructions for a media guidance application stored in memory (i.e., storage 408). In client-server based embodiments, control circuitry 404 may include communications circuitry suitable for communicating with a guidance application server or other networks or servers. Communications circuitry may include a cable modem, an integrated services digital network (ISDN) modem, a digital subscriber line (DSL) modem, a telephone modem, or a wireless modem for communications with other equipment. Such communications may involve the Internet or any other suitable communications networks or paths (which is described in more detail in connection with FIG. 5). In addition, communications circuitry may include circuitry that enables peer-to-peer communication of user equipment devices, or communication of user equipment devices in locations remote from each other (described in more detail below).

Memory (e.g., random-access memory, read-only memory, or any other suitable memory), hard drives, optical drives, or any other suitable fixed or removable storage devices (e.g., DVD recorder, CD recorder, video cassette recorder, or other suitable recording device) may be provided as storage 408 that is part of control circuitry 404.

Storage 408 may include one or more of the above types of storage devices. For example, user equipment device 400 may include a hard drive for a DVR (sometimes called a personal video recorder, or PVR) and a DVD recorder as a secondary storage device. Storage 408 may be used to store various types of media described herein and guidance application data, including program information, guidance application settings, user preferences or profile information, or other data used in operating the guidance application. Nonvolatile memory may also be used (e.g., to launch a boot-up routine and other instructions).

Control circuitry 404 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 404 may also include scaler circuitry for upconverting and downconverting media into the preferred output format of the user equipment 400. Circuitry 404 may also include digital-to-analog converter circuitry and analog-to-digital converter circuitry for converting between digital and analog signals. The tuning and encoding circuitry may be used by the user equipment to receive and to display, to play, or to record media content. The tuning and encoding circuitry may also be used to receive guidance data. The circuitry described herein, including for example, the tuning, video generating, encoding, decoding, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 408 is provided as a separate device from user equipment 400, the tuning and encoding circuitry (including multiple tuners) may be associated with storage 408.

A user may control the control circuitry 404 using user input interface 310. User input interface 410 may be any suitable user interface, such as a remote control, mouse, trackball, keypad, keyboard, touch screen, touch pad, stylus input, joystick, voice recognition interface, or other user input interfaces. Display 412 may be provided as a stand-alone device or integrated with other elements of user equipment device 400. Display 412 may be one or more of a monitor, a television, a liquid crystal display (LCD) for a mobile device, or any other suitable equipment for displaying visual images. In some embodiments, display 412 may be HDTV-capable. Speakers 414 may be provided as integrated with other elements of user equipment device 400 or may be stand-alone units. The audio component of videos and other media content displayed on display 412 may be played through speakers 414. In some embodiments, the audio may be distributed to a receiver (not shown), which processes and outputs the audio via speakers 414.

The guidance application may be implemented using any suitable architecture. For example, it may be a stand-alone application wholly implemented on user equipment device 400. In such an approach, instructions of the application are stored locally, and data for use by the application is downloaded on a periodic basis (e.g., from the VBI of a television channel, from an out-of-band feed, or using another suitable approach). In another embodiment, the media guidance application is a client-server based application. Data for use by a thick or thin client implemented on user equipment device 400 is retrieved on-demand by issuing requests to a server remote to the user equipment device 400. In one example of a client-server based guidance application, control circuitry 404 runs a web browser that interprets web pages provided by a remote server.

In yet other embodiments, the media guidance application is downloaded and interpreted or otherwise run by an interpreter or virtual machine (run by control circuitry 404). In some embodiments, the guidance application may be encoded in the ETV Binary Interchange Format (EBIF), received by control circuitry 404 as part of a suitable feed, and interpreted by a user agent running on control circuitry 404. For example, the guidance application may be a EBIF widget. In other embodiments, the guidance application may be defined by a series of JAVA-based files that are received and run by a local virtual machine or other suitable middleware executed by control circuitry 304. In some of such embodiments (e.g., those employing MPEG-2 or other digital media encoding schemes), the guidance application may be, for example, encoded and transmitted in an MPEG-2 object carousel with the MPEG audio and video packets of a program. In some embodiments, the guidance application may be generated by a remote server and transmitted to user equipment as a MPEG stream.

Figure 4:
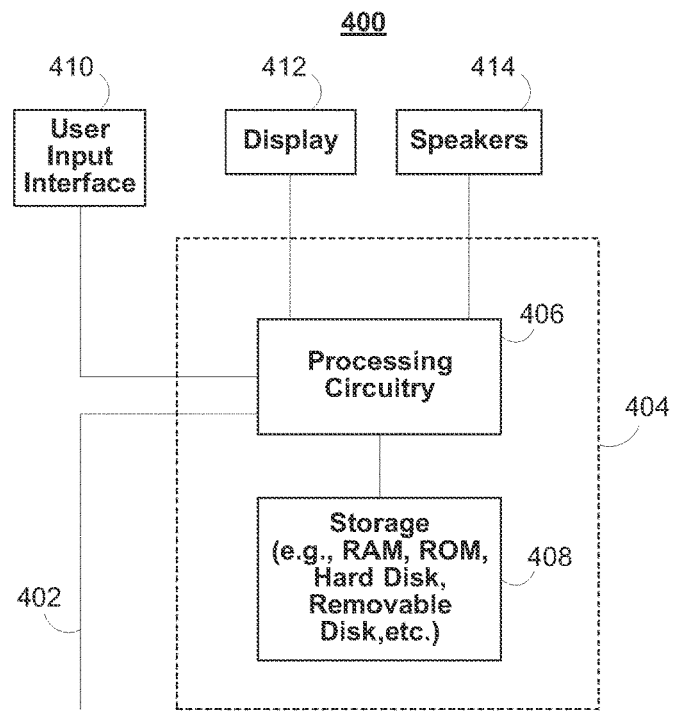
FIG. 4 is a block diagram of an illustrative user equipment device in accordance with some embodiments of the disclosure.
Figure 5:
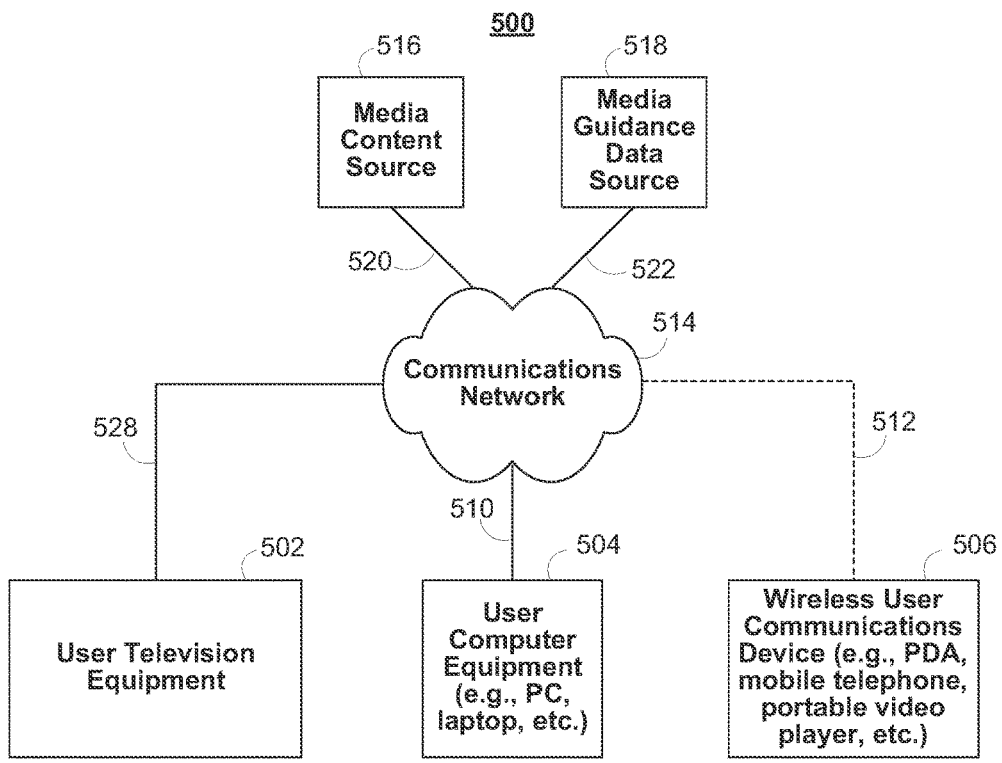
FIG. 5 is a block diagram of an illustrative media system in accordance with some embodiments of the disclosure.

User equipment device 400 of FIG. 4 can be implemented in system 500 of FIG. 5 as user television equipment 502, user computer equipment 504, wireless user communications device 506, or any other type of user equipment suitable for accessing media, such as a non-portable gaming machine. For simplicity, these devices may be referred to herein collectively as user equipment or user equipment devices. User equipment devices, on which a media guidance application is implemented, may function as a stand-alone device or may be part of a network of devices. Various network configurations of devices may be implemented and are discussed in more detail below.

User television equipment 502 may include a set-top box, an integrated receiver decoder (IRD) for handling satellite television, a television set, a digital storage device, a DVD recorder, a video-cassette recorder (VCR), a local media server, or other user television equipment. One or more of these devices may be integrated to be a single device, if desired. User computer equipment 504 may include a PC, a laptop, a tablet, a WebTV box, a personal computer television (PC/TV), a PC media server, a PC media center, or other user computer equipment. WEBTV is a trademark owned by Microsoft Corp. Wireless user communications device 506 may include PDAs, a mobile telephone, a portable video player, a portable music player, a portable gaming machine, or other wireless devices.

It should be noted that with the advent of television tuner cards for PC's, WebTV, and the integration of video into other user equipment devices, the lines have become blurred when trying to classify a device as one of the above devices. In fact, each of user television equipment 502, user computer equipment 504, and wireless user communications device 506 may utilize at least some of the system features described above in connection with FIG. 4 and, as a result, include flexibility with respect to the type of media content available on the device. For example, user television equipment 502 may be Internet-enabled allowing for access to Internet content, while user computer equipment 504 may include a tuner allowing for access to television programming. The media guidance application may also have the same layout on the various different types of user equipment or may be tailored to the display capabilities of the user equipment. For example, on user computer equipment, the guidance application may be provided as a web site accessed by a web browser. In another example, the guidance application may be scaled down for wireless user communications devices.

In system 400, there is typically more than one of each type of user equipment device but only one of each is shown in FIG. 5 to avoid overcomplicating the drawing. In addition, each user may utilize more than one type of user equipment device (e.g., a user may have a television set and a computer) and also more than one of each type of user equipment device (e.g., a user may have a PDA and a mobile telephone and/or multiple television sets).

The user may also set various settings to maintain consistent media guidance application settings across in-home devices and remote devices. Settings include those described herein, as well as channel and program favorites, programming preferences that the guidance application utilizes to make programming recommendations, display preferences, and other desirable guidance settings. For example, if a user sets a channel as a favorite on, for example, the web site www.tvguide.com on their personal computer at their office, the same channel would appear as a favorite on the user's in-home devices (e.g., user television equipment and user computer equipment) as well as the user's mobile devices, if desired. Therefore, changes made on one user equipment device can change the guidance experience on another user equipment device, regardless of whether they are the same or a different type of user equipment device. In addition, the changes made may be based on settings input by a user, as well as user activity monitored by the guidance application.

The user equipment devices may be coupled to communications network 514. Namely, user television equipment 502, user computer equipment 504, and wireless user communications device 506 are coupled to communications network 514 via communications paths 508, 510, and 512, respectively. Communications network 514 may be one or more networks including the Internet, a mobile phone network, mobile device (e.g., Blackberry) network, cable network, public switched telephone network, or other types of communications network or combinations of communications networks. BLACKBERRY is a service mark owned by Research In Motion Limited Corp. Paths 508, 510, and 512 may separately or together include one or more communications paths, such as, a satellite path, a fiber-optic path, a cable path, a path that supports Internet communications (e.g., IPTV), free-space connections (e.g., for broadcast or other wireless signals), or any other suitable wired or wireless communications path or combination of such paths. Path 512 is drawn with dotted lines to indicate that in the exemplary embodiment shown in FIG. 5 it is a wireless path and paths 508 and 510 are drawn as solid lines to indicate they are wired paths (although these paths may be wireless paths, if desired). Communications with the user equipment devices may be provided by one or more of these communications paths, but are shown as a single path in FIG. 5 to avoid overcomplicating the drawing.

Although communications paths are not drawn between user equipment devices, these devices may communicate directly with each other via communication paths, such as those described above in connection with paths 508, 510, and 512, as well other short-range point-to-point communication paths, such as USB cables, IEEE 1394 cables, wireless paths (e.g., Bluetooth, infrared, IEEE 802-11x, etc.), or other short-range communication via wired or wireless paths. BLUETOOTH is a certification mark owned by Bluetooth SIG, INC. The user equipment devices may also communicate with each other directly through an indirect path via communications network 514.

System 500 includes media content source 516 and media guidance data source 518 coupled to communications network 514 via communication paths 520 and 522, respectively. Paths 520 and 522 may include any of the communication paths described above in connection with paths 508, 510, and 512. Communications with the media content source 516 and media guidance data source 518 may be exchanged over one or more communications paths, but are shown as a single path in FIG. 5 to avoid overcomplicating the drawing. In addition, there may be more than one of each of media content source 516 and media guidance data source 518, but only one of each is shown in FIG. 5 to avoid overcomplicating the drawing. (The different types of each of these sources are discussed below.) If desired, media content source 516 and media guidance data source 518 may be integrated as one source device. Although communications between sources 516 and 518 with user equipment devices 502, 504, and 506 are shown as through communications network 514, in some embodiments, sources 516 and 518 may communicate directly with user equipment devices 502, 504, and 506 via communication paths (not shown) such as those described above in connection with paths 508, 510, and 412.

Media content source 516 may include one or more types of media distribution equipment including a television distribution facility, cable system headend, satellite distribution facility, programming sources (e.g., television broadcasters, such as NBC, ABC, HBO, etc.), intermediate distribution facilities and/or servers, Internet providers, on-demand media servers, and other media content providers. NBC is a trademark owned by the National Broadcasting Company, Inc., ABC is a trademark owned by the ABC, INC., and HBO is a trademark owned by the Home Box Office, Inc. Media content source 516 may be the originator of media content (e.g., a television broadcaster, a Webcast provider, etc.) or may not be the originator of media content (e.g., an on-demand media content provider, an Internet provider of video content of broadcast programs for downloading, etc.). Media content source 516 may include cable sources, satellite providers, on-demand providers, Internet providers, or other providers of media content. Media content source 516 may also include a remote media server used to store different types of media content (including video content selected by a user), in a location remote from any of the user equipment devices. Systems and methods for remote storage of media content, and providing remotely stored media content to user equipment are discussed in greater detail in connection with Ellis et al., U.S. patent application Ser. No. 09/332,244, filed Jun. 11, 1999, which is hereby incorporated by reference herein in its entirety.

Media guidance data source 518 may provide media guidance data, such as media listings, media-related information (e.g., broadcast times, broadcast channels, media titles, media descriptions, ratings information (e.g., parental control ratings, critic's ratings, etc.), genre or category information, actor information, logo data for broadcasters' or providers' logos, etc.), media format (e.g., standard definition, high definition, etc.), advertisement information (e.g., text, images, media clips, etc.), on-demand information, and any other type of guidance data that is helpful for a user to navigate among and locate desired media selections.

Media guidance application data may be provided to the user equipment devices using any suitable approach. In some embodiments, the guidance application may be a stand-alone interactive television program guide that receives program guide data via a data feed (e.g., a continuous feed, trickle feed, or data in the vertical blanking interval of a channel).

Program schedule data and other guidance data may be provided to the user equipment on a television channel sideband, in the vertical blanking interval of a television channel, using an in-band digital signal, using an out-of-band digital signal, or by any other suitable data transmission technique. Program schedule data and other guidance data may be provided to user equipment on multiple analog or digital television channels. Program schedule data and other guidance data may be provided to the user equipment with any suitable frequency (e.g., continuously, daily, a user-specified period of time, a system-specified period of time, in response to a request from user equipment, etc.). In some approaches, guidance data from media guidance data source 518 may be provided to users' equipment using a client-server approach. For example, a guidance application client residing on the user's equipment may initiate sessions with source 518 to obtain guidance data when needed. Media guidance data source 518 may provide user equipment devices 502, 504, and 506 the media guidance application itself or software updates for the media guidance application.

Media guidance applications may be, for example, stand-alone applications implemented on user equipment devices. In other embodiments, media guidance applications may be client-server applications where only the client resides on the user equipment device. For example, media guidance applications may be implemented partially as a client application on control circuitry 504 of user equipment device 500 and partially on a remote server as a server application (e.g., media guidance data source 518). The guidance application displays may be generated by the media guidance data source 518 and transmitted to the user equipment devices. The media guidance data source 518 may also transmit data for storage on the user equipment, which then generates the guidance application displays based on instructions processed by control circuitry.

Media guidance system 500 is intended to illustrate a number of approaches, or network configurations, by which user equipment devices and sources of media content and guidance data may communicate with each other for the purpose of accessing media and providing media guidance. The present invention may be applied in any one or a subset of these approaches, or in a system employing other approaches for delivering media and providing media guidance. The following three approaches provide specific illustrations of the generalized example of FIG. 5.

In one approach, user equipment devices may communicate with each other within a home network. User equipment devices can communicate with each other directly via short-range point-to-point communication schemes describe above, via indirect paths through a hub or other similar device provided on a home network, or via communications network 514. Each of the multiple individuals in a single home may operate different user equipment devices on the home network. As a result, it may be desirable for various media guidance information or settings to be communicated between the different user equipment devices. For example, it may be desirable for users to maintain consistent media guidance application settings on different user equipment devices within a home network, as described in greater detail in Ellis et al., U.S. patent application Ser. No. 11/179,410, filed Jul. 11, 2005. Different types of user equipment devices in a home network may also communicate with each other to transmit media content. For example, a user may transmit media content from user computer equipment to a portable video player or portable music player.

In a second approach, users may have multiple types of user equipment by which they access media content and obtain media guidance. For example, some users may have home networks that are accessed by in-home and mobile devices. Users may control in-home devices via a media guidance application implemented on a remote device. For example, users may access an online media guidance application on a website via a personal computer at their office, or a mobile device such as a PDA or web-enabled mobile telephone. The user may set various settings (e.g., recordings, reminders, or other settings) on the online guidance application to control the user's in-home equipment. The online guide may control the user's equipment directly, or by communicating with a media guidance application on the user's in-home equipment. Various systems and methods for user equipment devices communicating, where the user equipment devices are in locations remote from each other, is discussed in, for example, Ellis et al., U.S. patent application Ser. No. 10/927,814, filed Aug. 26, 2004, which is hereby incorporated by reference herein in its entirety.

In a third approach, users of user equipment devices inside and outside a home can use their media guidance application to communicate directly with media content source 516 to access media content. Specifically, within a home, users of user television equipment 504 and user computer equipment 506 may access the media guidance application to navigate among and locate desirable media content. Users may also access the media guidance application outside of the home using wireless user communications devices 506 to navigate among and locate desirable media content.

In a fourth approach, user equipment devices may operate in a cloud computing environment to access cloud services. In a cloud computing environment, various types of computing services for content sharing, storage or distribution (e.g., video sharing sites or social networking sites) are provided by a collection of network-accessible computing and storage resources, referred to as "the cloud." For example, the cloud can include a collection of server computing devices, which may be located centrally or at distributed locations, that provide cloud-based services to various types of users and devices connected via a network such as the Internet via communications network 514. These cloud resources may include one or more content sources 516 and one or more media guidance data sources 518. In addition or in the alternative, the remote computing sites may include other user equipment devices, such as user television equipment 502, user computer equipment 504, and wireless user communications device 506. For example, the other user equipment devices may provide access to a stored copy of a video or a streamed video. In such embodiments, user equipment devices may operate in a peer-to-peer manner without communicating with a central server.

The cloud provides access to services, such as content storage, content sharing, or social networking services, among other examples, as well as access to any content described above, for user equipment devices. Services can be provided in the cloud through cloud computing service providers, or through other providers of online services. For example, the cloud-based services can include a content storage service, a content sharing site, a social networking site, or other services via which user-sourced content is distributed for viewing by others on connected devices. These cloud-based services may allow a user equipment device to store content to the cloud and to receive content from the cloud rather than storing content locally and accessing locally-stored content.

A user may use various content capture devices, such as camcorders, digital cameras with video mode, audio recorders, mobile phones, and handheld computing devices, to record content. The user can upload content to a content storage service on the cloud either directly, for example, from user computer equipment 504 or wireless user communications device 506 having content capture feature. Alternatively, the user can first transfer the content to a user equipment device, such as user computer equipment 504. The user equipment device storing the content uploads the content to the cloud using a data transmission service on communications network 514. In some embodiments, the user equipment device itself is a cloud resource, and other user equipment devices can access the content directly from the user equipment device on which the user stored the content.

Cloud resources may be accessed by a user equipment device using, for example, a web browser, a media guidance application, a desktop application, a mobile application, and/or any combination of access applications of the same. The user equipment device may be a cloud client that relies on cloud computing for application delivery, or the user equipment device may have some functionality without access to cloud resources. For example, some applications running on the user equipment device may be cloud applications, i.e., applications delivered as a service over the Internet, while other applications may be stored and run on the user equipment device. In some embodiments, a user device may receive content from multiple cloud resources simultaneously. For example, a user device can stream audio from one cloud resource while downloading content from a second cloud resource. Or a user device can download content from multiple cloud resources for more efficient downloading. In some embodiments, user equipment devices can use cloud resources for processing operations such as the processing operations performed by processing circuitry described in relation to FIG. 4.

Figure 6:
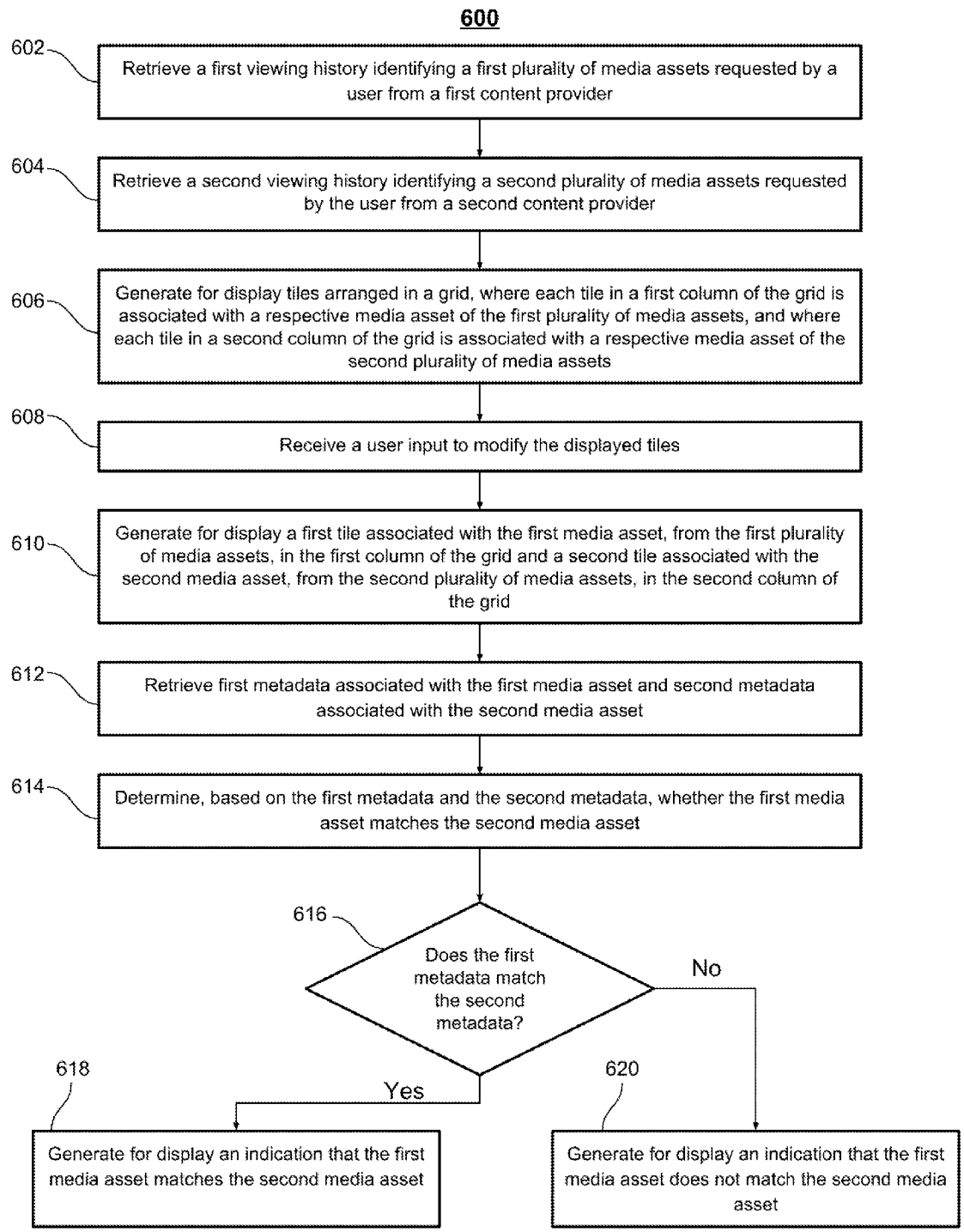
FIG. 6 depicts an illustrative process for generating an interactive media guidance game, in accordance with some embodiments of this disclosure.

FIG. 6 is a flowchart of illustrative steps for generating an interactive media guidance game. For example, a media guidance application implementing process 600 may be executed by control circuitry 404. In some embodiments, instructions for executing process 600 may be encoded onto a non-transitory storage medium (e.g., storage 408) as a set of instructions to be decoded and executed by processing circuitry (e.g., processing circuitry 406). Processing circuitry may, in turn, provide instructions to other sub-circuits contained within control circuitry 404, such as the tuning, video generating, encoding, decoding, encrypting, decrypting, scaling, analog/digital conversion circuitry, and the like. It should be noted that process 600, or any step thereof, could be performed on, or provided by, any of the devices shown in FIGS. 4-5.

Process 600 begins at 602, where the media guidance application (e.g., via control circuitry 404) retrieves a first viewing history identifying a first plurality of media assets requested by a user from a first content provider. For example, control circuitry 404 may transmit a query to a server storing the first viewing history. For example, control circuitry 404 may transmit a query via communications network 414 to media guidance data source 418. Control circuitry 404 may receive a response from media guidance data source 418 including the first viewing history.

At 604, control circuitry 404 retrieves a second viewing history identifying a second plurality of media assets requested by the user from a second content provider. For example, control circuitry 404 may contact a second server associated with the second content provider to retrieve the second viewing history. For example, control circuitry 404 may transmit a query via communications network 414 to media guidance data source 418, which is associated with the second content provider. In another example, control circuitry 404 may have the second viewing history stored locally to control circuitry 404. For example, control circuitry 404 may retrieve the second viewing history from storage 408.

At 606, control circuitry 404 generates for display tiles arranged in a grid, where each tile in a first column of the grid is associated with a respective media asset of the first plurality of media assets, and where each tile in a second column of the grid is associated with a respective media asset of the second plurality of media assets. For example, control circuitry 404 may generate for display on display 412 pre-play display 118 including a plurality of tiles, such as first tile 108 and second tile 110, and a button, such as button 102, to commence gameplay. In some embodiments, control circuitry 404 may generate for display a blank grid before gameplay is commenced. For example, control circuitry 404 may generate for display first tile 108 and second tile 110 without any of the images depicted in pre-play display 118. In another embodiment, control circuitry 404 may associate first tile 108 and second tile 110 with a media asset from the first viewing history and the second viewing history, respectively. For example, control circuitry 404 may select a first most recently requested media asset from the first viewing history and a second most recently requested media asset from the second viewing history. Control circuitry 404 may associate the first most recently requested media asset with first tile 108 and may associate the second most recently requested media asset with second tile 110. Control circuitry 404 may retrieve metadata associated with each of the media assets and may generate a tile based on the metadata. For example, control circuitry 404 may retrieve metadata associated with the first media asset, such as an image associated with the first media asset, and may generate for display the image in first tile 108.

At 608, control circuitry 404 may receive a user input to modify the displayed tiles. For example, control circuitry 404 may receive, via user input interface 410, a user input indicating that button 102. For example, control circuitry 404 may receive the user input from button 102 via a physical button accessible to control circuitry 404 via user input interface 410. In another example, control circuitry 404 receives the user input based on receiving a touch input from user input interface 410 and correlating a location of the touch input to a location of button 102 on display 412.

At 610, control circuitry 404 generates for display a first tile associated with the first media asset, from the first plurality of media assets, in the first column of the grid and a second tile associated with the second media asset, from the second plurality of media assets, in the second column of the grid. For example, control circuitry 404 may generate for display third tile 124 in first column 104 of the grid; and may generate for display fourth tile 126 in second column 106 of the grid. As described above, control circuitry 404 may retrieve metadata associated with the first media asset and the second media asset from a metadata storage facility, such as media guidance data source 518 or storage 408. Based on the retrieved metadata, control circuitry 404 may generate for display an indication of the first media asset (e.g., a title of the first media asset) in third tile 124 and an indication of the second media asset (e.g., an image associated with the second media asset) in fourth tile 126.

At 612, control circuitry 404 retrieves first and associated with the first media asset and retrieves second metadata associated with the second media asset. As described above, control circuitry 404 may query a metadata database, such as media guidance data source 518, located remotely to control circuitry 404, or storage 408, located locally to control circuitry 404.

At 614, control circuitry 404 determines, based on the first metadata and the second metadata, whether the first media asset matches the second media asset. For example, control circuitry 404 may compare fields of the first metadata to fields in the second metadata. When data in a first field of the first metadata matches data in a corresponding field of the second metadata, control circuitry 404 may determine that the first media asset matches the second media asset. When data in a first field of the first metadata does not match data in a corresponding field of the second metadata, control circuitry 404 may determine that the first media asset does not match the second media asset.

At 616, control circuitry 404 determines whether the first media asset matches the second media asset. As described above in relation to step 614, if control circuitry 404 determines that a portion of the first metadata matches a portion of the second metadata, control circuitry 404 determines that the first media asset matches the second media asset and control circuitry 404 proceeds to step 618. Alternatively, if control circuitry 404 determines that none of the first metadata matches any of the second metadata, control circuitry 404 determines that the first media asset does not match the second media asset and control circuitry 404 proceeds to 620.

At 618, control circuitry 404 generates for display an indication that the first media asset matches the second media asset. For example, control circuitry 404 may generate for display message 122 indicating to the user that he/she has won the game. In some embodiments, control circuitry 404 may include in message 122 an indication of a prize that the user has won by matching the first media asset and the second media asset. For example, control circuitry 404 may generate for display a link allowing the user to retrieve a media asset that the user is restricted from accessing (e.g., restricted because the user does not have a subscription to retrieve the media asset)

At 620, control circuitry 404 generates for display an indication that the first media asset does not match the second media asset. For example, control circuitry 404 may generate for display message 122 with text indicating to the user that he/she has not won the game.

It is contemplated that the steps or descriptions of FIG. 6 may be used with any other embodiment of this disclosure. In addition, the descriptions described in relation to the algorithm of FIG. 6 may be done in alternative orders or in parallel to further the purposes of this disclosure. For example, conditional statements and logical evaluations may be performed in any order or in parallel or simultaneously to reduce lag or increase the speed of the system or method. As a further example, in some embodiments, several instances of a variable may be evaluated in parallel, using multiple logical processor threads, or the algorithm may be enhanced by incorporating branch prediction. Furthermore, it should be noted that the process of FIG. 6 may be implemented on a combination of appropriately configured software and hardware, and that any of the devices or equipment discussed in relation to FIGS. 4-5 could be used to implement one or more portions of the process.

Figure 7:
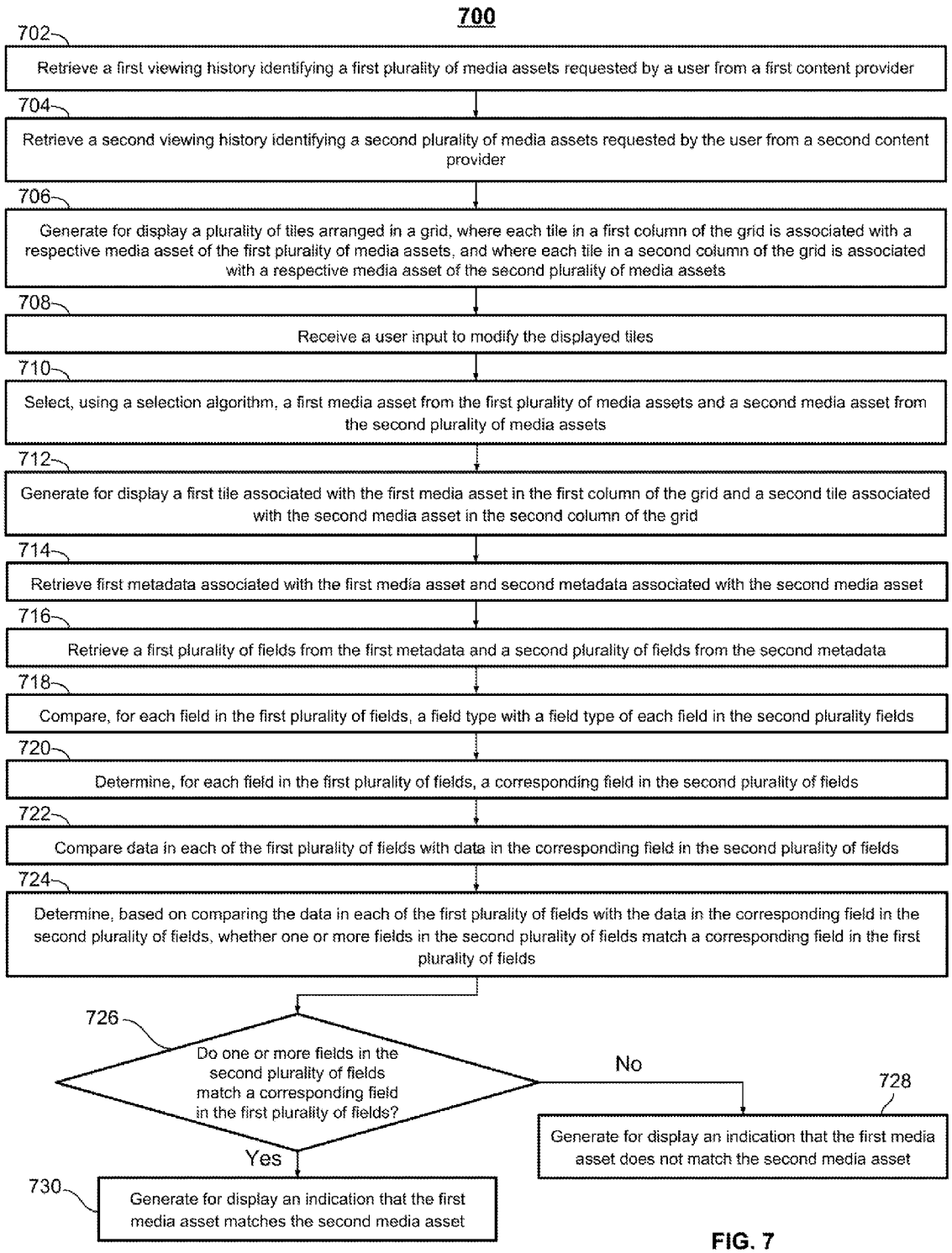
FIG. 7 depicts another illustrative process for generating an interactive media guidance game, in accordance with some embodiments of this disclosure.

FIG. 7 is a flowchart of illustrative steps for generating an interactive media guidance game, in accordance with some embodiments of the disclosure. For example, a media guidance application implementing process 700 may be executed by control circuitry 404. In some embodiments, instructions for executing process 700 may be encoded onto a non-transitory storage medium (e.g., storage 408) as a set of instructions to be decoded and executed by processing circuitry (e.g., processing circuitry 406). Processing circuitry may, in turn, provide instructions to other sub-circuits contained within control circuitry 404, such as the tuning, video generating, encoding, decoding, encrypting, decrypting, scaling, analog/digital conversion circuitry, and the like. It should be noted that process 700, or any step thereof, could be performed on, or provided by, any of the devices shown in FIGS. 4-5.

Process 700 begins at 702 where control circuitry 404 retrieves a first viewing history identify a first plurality of media assets requested by a user from a first content provider. As described above in relation to FIG. 6, step 602, control circuitry 404 may transmit a query to a server storing the first viewing history. For example, control circuitry 404 may transmit a query via communications network 414 to media guidance data source 418. Control circuitry 404 may receive a response from media guidance data source 418 including the first viewing history. In another example, control circuitry 404 may retrieve the first viewing history from storage 408 from a profile associated with the user.

At 704, control circuitry 404 retrieves a second viewing history identify a second plurality of media assets requested by the user from a second content provider. As described above in relation to FIG. 6, step 604, control circuitry 404 may contact a second server associated with the second content provider to retrieve the second viewing history. For example, control circuitry 404 may transmit a query via communications network 414 to media guidance data source 418, which is associated with the second content provider. In another example, control circuitry 404 may have the second viewing history stored locally to control circuitry 404. For example, control circuitry 404 may retrieve the second viewing history from storage 408.

At 706, control circuitry 404 generates for display a plurality of tiles arranged in a grid, were each tile in a first column of the grid is associated with a respective media asset of the first plurality of media assets, and where each tile in a second column of the grid is associated with a respective media asset of the second plurality of media assets. For example, control circuitry may generate for display on display 412 pre-play display 118 including a plurality of tiles, such as first tile 108 and second tile 110, and a button, such as button 102. Control circuitry 404 may associate first tile 108 and second tile 110 with a media asset from the first viewing history and the second viewing history, respectively. For example, control circuitry 404 may pseudo-randomly select a first media asset from the first viewing history and may pseudo-randomly select a second media asset from the second viewing history. Control circuitry 404 may associate the first media asset with first tile 108 and may associate the second media asset with second tile 110. Control circuitry 404 may retrieve metadata associated with each of the media assets and may generate a tile based on the metadata. For example, control circuitry 404 may retrieve metadata associated with the first media asset, such as an image associated with the first media asset, and may generate for display the image in first tile 108. Likewise, control circuitry 404 may retrieve metadata associated with the second media asset, such as an image associated with the second media asset, and may generate for display the image in second tile 110.

At 708, control circuitry 404 receives a user input to modify the displayed tiles. For example, control circuitry 404 may receive, a user input via user input interface 710 indicating that a user has selected button 102 to begin playing the interactive media guidance game depicted in pre-play display 118.

At 710, control circuitry 404 selects, using a selection algorithm, a first media asset from the first plurality of media assets and a second media asset from the second plurality of media assets. For example, as described above control circuitry 404 may determine that the first viewing history and the second viewing history indicate a time when each media asset of the first and the second viewing history were last requested by the user. Control circuitry 404 may select from the first viewing history a first media asset based on a determination that it was the media asset that was most recently requested by the user from the first content provider. Control circuitry 404 may select from the second viewing history a second media asset based on a determination that it was the media asset that was most recently requested by the user from the second content provider.

At 712, control circuitry 404 generates for display a first tile associated with the first media asset in the first column of the grid and a second tile associated with the second media asset in the second column of the grid. For example, control circuitry 404 may associate a first column of the grid, such as first column 104 with the first content provider, and may associated the second column of the grid, such as second column 106 with the second content provider. Control circuitry 404 may generate for display a tile associated with the first media asset (e.g., third tile 124) in the first column 104 because the first media asset was selected by control circuitry 404 from the first viewing history, which is associated with the first content provider. Control circuitry 404 may generate for display a tile associated with the second media asset (e.g., fourth tile 126) in the second column of the grid because control circuitry 404 retrieved the second media asset from the second viewing history, which is associated with the second content provider.

At 714, control circuitry 404 retrieves first metadata associated with the first media asset and second metadata associated with the second media asset. For example, control circuitry 404 may query a metadata database located remote to control circuitry 404, such as media guidance data source 518, or local to control circuitry 404, such as storage 408. For example, control circuitry 404 may transmit a query including a unique identifier to the database to look up data associated with the unique identifier. Control circuitry 404 may receive, from the database, metadata that is associated with the transmitted unique identifier.

At 716, control circuitry 404 retrieves a first plurality of fields from the first metadata and a second plurality of fields from the second metadata. For example, control circuitry 404 may identify a data structure associated with the metadata, such as an XML data structure. Control circuitry 404 may identify the fields, or tags that are associated with the various data of the metadata.

At 718, control circuitry 404 compares, for each field in the first plurality of fields, a field type with a field type of each field in the second plurality of fields. For example, control circuitry 404 may determine that the first metadata has a first plurality of fields such a title field, an actor field and a genre filed. Control circuitry 404 may also determine that the second metadata has a second plurality of fields, such as a title field, actor field, genre field, and a year released field. May compare the field types in the first plurality of fields to the field types in the second plurality of fields to determine whether there are any corresponding fields. For example, control circuitry 404 may determine that both the first and the second plurality of field types include a title, actor and genre field.

At 720, control circuitry 404 determines for each field in the first plurality of fields, a corresponding field in the second plurality of fields. For example, as described above, control circuitry 404 may compare each of the field types in the first plurality of field types to each of the field types in the second plurality of field types to identify field types in the first metadata that have a matching field type in the second metadata. Following from the previous example, control circuitry 404 may determine that the first metadata and the second metadata both comprise title, actor, and genre fields.

At 722, control circuitry 404 compares data in each of the first plurality of fields with data in the corresponding field in the second plurality of fields. For example, control circuitry 404 may compare data in title field from the first metadata to data in title field of the second metadata.

At 724, control circuitry 404 determines, based on based on comparing the data in each of the first plurality of fields with the data in the corresponding field in the second plurality of fields, whether one or more fields in the second plurality of fields match a corresponding field in the first plurality of fields. For example, control circuitry 404 may compare the data in the title field of the first metadata to the title field of the second metadata. Control circuitry 404 may perform the comparison for each of the fields in the first metadata that control circuitry 404 determined to have a corresponding field in the second metadata. Control circuitry 404 may track a number of fields of the first metadata that have data matching data in a corresponding field of the second metadata. For example, control circuitry 404 may determine that data in an actor field and data in a genre field match for the first metadata and the second metadata. Control circuitry 404 may store two as the number of metadata fields of the first media asset that match metadata fields of the second metadata.

At 726, control circuitry 404 determines whether one or more fields in the second plurality of fields match a corresponding field in the first plurality of fields. For example, control circuitry 404 may compare data in a title field of the first metadata with data in a title field of the second metadata. When control circuitry 404 determines that none of the data in the fields of the second metadata match data in the fields of the first metadata control circuitry 404 proceeds to step 728 to indicate that the user has lost the game. When control circuitry 404 determines that at least one of the fields in the second plurality of fields match a corresponding field in the first plurality of fields (e.g., when control circuitry 404 determines that data in a genre field of the first metadata matches data in a genre field of the second metadata), control circuitry 404 proceeds to 730 to indicate to the user that he/she has won the game.

At 728, control circuitry 404 generates for display an indication that the first media asset does not match the second media asset. For example, control circuitry 404 may generate for display a message, such as message 122 indicating to the user that he/she has lost the game.

At 730, control circuitry 404 generates for display an indication that the first media asset matches the second media asset. For example, control circuitry 404 may generate for display a message, such as message 122 indicating to the user that he/she has won the game. In some embodiments, message 122 will include an indication of whether the user has won a prize based on matching the first media asset and the second media asset. For example, control circuitry 404 may award the user with a digital badge indicating that the user has won the game.

It is contemplated that the steps or descriptions of FIG. 7 may be used with any other embodiment of this disclosure. In addition, the descriptions described in relation to the algorithm of FIG. 7 may be done in alternative orders or in parallel to further the purposes of this disclosure. For example, conditional statements and logical evaluations may be performed in any order or in parallel or simultaneously to reduce lag or increase the speed of the system or method. As a further example, in some embodiments, several instances of a variable may be evaluated in parallel, using multiple logical processor threads, or the algorithm may be enhanced by incorporating branch prediction. Furthermore, it should be noted that the process of FIG. 7 may be implemented on a combination of appropriately configured software and hardware, and that any of the devices or equipment discussed in relation to FIGS. 4-5 could be used to implement one or more portions of the process.

Figure 8:
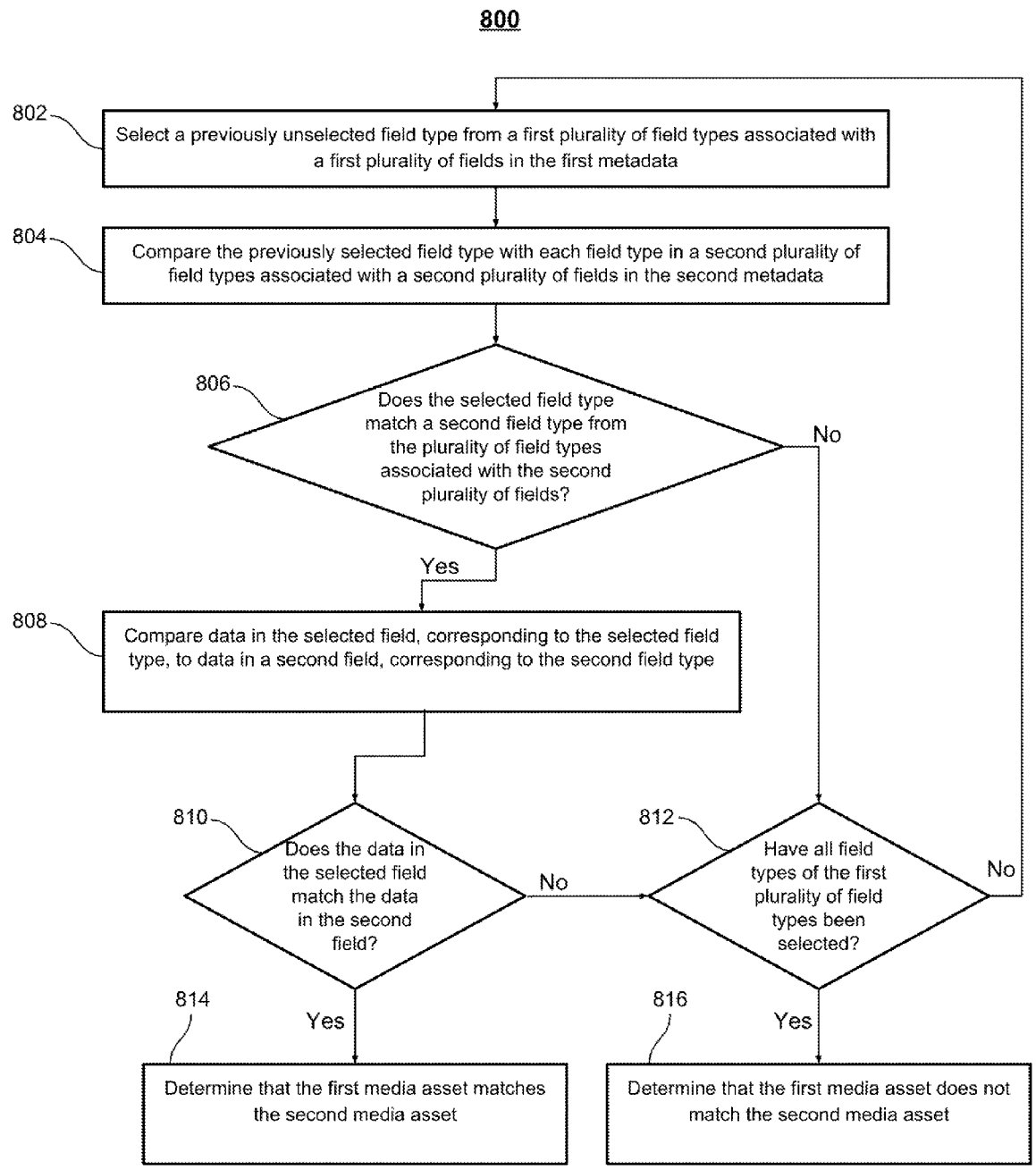
FIG. 8 depicts an illustrative process for comparing metadata associated with a first and a second media asset, in accordance with some embodiments of this disclosure.

FIG. 8 is a flowchart of illustrative steps for comparing metadata associated with a first and a second media asset, in accordance with some embodiments of the disclosure. For example, a media guidance application implementing process 800 may be executed by control circuitry 404. In some embodiments, instructions for executing process 800 may be encoded onto a non-transitory storage medium (e.g., storage 408) as a set of instructions to be decoded and executed by processing circuitry (e.g., processing circuitry 406). Processing circuitry may, in turn, provide instructions to other sub-circuits contained within control circuitry 404, such as the tuning, video generating, encoding, decoding, encrypting, decrypting, scaling, analog/digital conversion circuitry, and the like. It should be noted that process 800, or any step thereof, could be performed on, or provided by, any of the devices shown in FIGS. 4-5.

Process 800 begins at 802 where control circuitry 404 selects a previously unselected field type from a first plurality of field types associated with a first plurality of fields in the first metadata. Control circuitry 404 may iteratively select each field of metadata from the first metadata and may compare the respective field to each field the second metadata to determine whether the second metadata has a field corresponding to a field in the first metadata. For example, control circuitry 404 may retrieve first metadata associated with the first media asset and second metadata associated with the second media asset. Control circuitry 404 may select, from a first plurality of fields of the first metadata, a previously unselected field to be used by control circuitry 404 to determine whether the second metadata has a corresponding field.

At 804, control circuitry 404 compares the selected field type with each filed type in a second plurality of field types associated with a second plurality of fields in the second metadata. For example, control circuitry 404 may compare the selected field type (e.g., a genre field type) to each of the field types in the second metadata. For example, control circuitry 404 may determine that the second metadata comprises a title field, an actor field, an actress field, and a genre field. Control circuitry 404 may compare the selected field type (e.g., the genre field type) to the types of fields in the second metadata (e.g., title, actor, actress, and genre field types).

At 806, control circuitry 404 determines whether the selected filed matches a second field type from the plurality of field types associated with the second plurality of fields. For example, control circuitry 404 may compare the first field type (e.g., the genre field type) to the plurality of field types of the second metadata (e.g., title, actor, actress, and genre field types). If the control circuitry 404 determines that the selected field type has a corresponding field type in the second metadata, control circuitry 404 proceeds to 808. For example, when control circuitry 404 determines that both the first metadata and the second metadata have a genre field of the metadata, control circuitry 404 proceeds to 808. If control circuitry 404 determines that the selected field type does not match a corresponding field type from the second metadata, control circuitry 404 proceeds to 812 when a next filed type is selected from the first metadata. For example, if control circuitry 404 were to determine that the second metadata does not have a genre field, control circuitry 404 would proceed to 812 to select a next metadata field from the first metadata if it is available.

At 808, control circuitry 404 compares data in the selected field corresponding to the selected field type, to data in a second field corresponding to the second filed type. For example, control circuitry 404 may determine that both the first metadata and the second metadata have a genre field type. In response to determining that the first metadata and the second metadata have a genre field type, control circuitry 404 may compare data in the genre field of the first metadata to data in the genre field of the second metadata.

At 810, control circuitry 404 determines whether data in the selected field matches data in the second field. For example, as described above, control circuitry 404 may compare data from a selected metadata field to data in a second metadata field in response to determining that the selected metadata field is a same type as the second metadata field. Control circuitry 404 may compare the data to identify a full match (e.g., by matching two text strings when they are exactly equal in their entirety), a partial match (e.g., by matching a portion of the data in the selected field to a portion of the data in the second field), no match (e.g., when none of the data in the selected field matches data in the second field), etc. When control circuitry 404 identifies a full or partial match, control circuitry 404 proceeds to 814 and determines that the first media asset matches the second media asset. When control circuitry 404 does not identify a match, control circuitry 404 proceeds to 812 to determine whether all field types of the first plurality of field types have been selected.

At 814, control circuitry 404 determines that the first media asset matches the second media asset. For example, control circuitry 404 may compare the data in the selected field to data in the second field as described above. Control circuitry 404 may determine that the first media asset matches the second media asset when at least a portion of the data in the first field matches a portion of the data in the second field. For example, control circuitry 404 may determine that the selected field comprises the genre "Action" and the second field comprises the genre "Action-Adventure". Control circuitry 404 may determine that the selected field matches the second field (and therefore the first media asset matches the second media asset) because "Action" matches at least a portion of "Action-Adventure".

At 812, control circuitry 404 determines whether all field types of the first plurality of field types have been selected. For example, control circuitry 404 may iteratively select each field type of the plurality of field types from the first metadata and may compare data in the field to a corresponding field in the second metadata. For example, control circuitry 404 may determine that the genre field is a second field out of four fields in the first metadata. Accordingly, the control circuitry 404 will proceed to 802 and may select a previously unselected field from the first metadata. Alternatively, if control circuitry 404 determines that control circuitry 404 has compared each field of the first plurality of fields (e.g., the genre field is the fourth field of the first plurality of fields) control circuitry 404 proceeds to 816 where control circuitry 404 determines that the first media asset does not match the second media asset.

At 816, control circuitry 404 determines that the first media asset does not match the second media asset. For example, at 816 control circuitry 404 has compared each of the fields of the first metadata to fields in the second metadata, when control circuitry 404 determined that the second metadata has a corresponding field to field in the first metadata, control circuitry 404 compared the data in the first field to data in the corresponding field of the second metadata and has determined that the data does not match. Based on the determination that none of the first metadata matches the second metadata, control circuitry 404 determines that the first media asset does not match the second media asset.

It is contemplated that the steps or descriptions of FIG. 8 may be used with any other embodiment of this disclosure. In addition, the descriptions described in relation to the algorithm of FIG. 8 may be done in alternative orders or in parallel to further the purposes of this disclosure. For example, conditional statements and logical evaluations may be performed in any order or in parallel or simultaneously to reduce lag or increase the speed of the system or method. As a further example, in some embodiments, several instances of a variable may be evaluated in parallel, using multiple logical processor threads, or the algorithm may be enhanced by incorporating branch prediction. Furthermore, it should be noted that the process of FIG. 8 may be implemented on a combination of appropriately configured software and hardware, and that any of the devices or equipment discussed in relation to FIGS. 4-5 could be used to implement one or more portions of the process.

Figure 9:
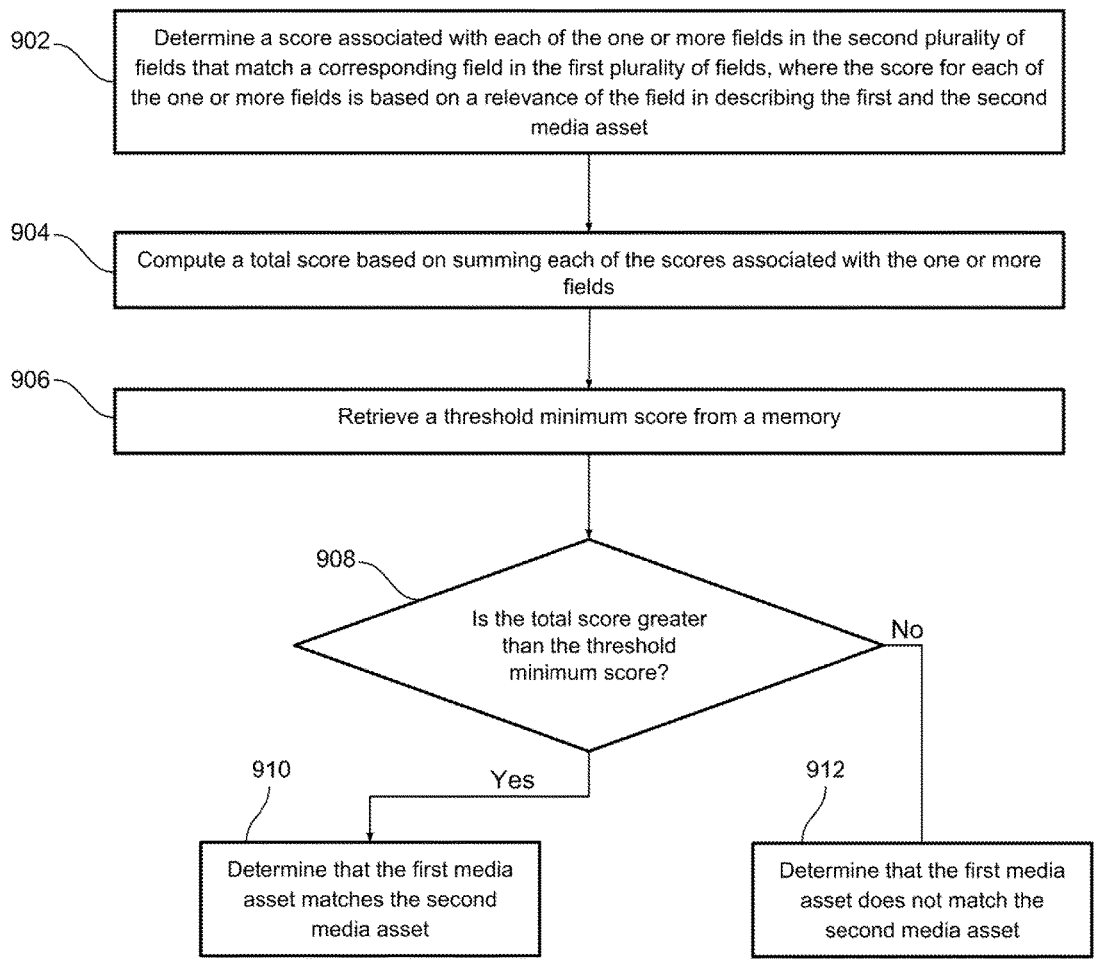
FIG. 9 depicts an illustrative process for determining whether metadata of a first media asset matches metadata of a second media asset, in accordance with some embodiments of this disclosure.

FIG. 9 is a flowchart of illustrative steps for determining whether metadata of the first media asset matches metadata of the second media asset, in accordance with some embodiments of the disclosure. For example, a media guidance application implementing process 900 may be executed by control circuitry 404. In some embodiments, instructions for executing process 900 may be encoded onto a non-transitory storage medium (e.g., storage 408) as a set of instructions to be decoded and executed by processing circuitry (e.g., processing circuitry 406). Processing circuitry may, in turn, provide instructions to other sub-circuits contained within control circuitry 404, such as the tuning, video generating, encoding, decoding, encrypting, decrypting, scaling, analog/digital conversion circuitry, and the like. It should be noted that process 900, or any step thereof, could be performed on, or provided by, any of the devices shown in FIGS. 4-5.

Process 900 begins at 902 where control circuitry 404 determines a score associated with each of the one or more fields in the second plurality of fields that match a corresponding field in the first plurality of fields, where the score for each of the one or more fields is based on a relevance of the field in describing the first and the second media asset. For example, control circuitry 404 may retrieve from storage 408 or from a remote database, such as media guidance data source 518, a table listing a score for various metadata fields. Control circuitry 404 may determine that the list is ranked based on how accurately a metadata field describes a media asset. For example, control circuitry 404 may determine that a "Series Title" field for a media asset is better at identifying a media asset than a "Release Year" field (e.g., because knowing that two media assets have a same "Series Title" may mean that they are more likely to be similar than two media assets having the same release year). Control circuitry 404 may, based on a determination that a first field has a greater relevancy than a second media asset field, assign a higher score to the first field than the second field. For example, control circuitry 404 may determine that data in the first metadata for a "Series Title" field and "Release Year" field match data in the second metadata for the "Series Title" field and "Release Year" field. Accordingly, control circuitry 404 may retrieve a score associated with each of the fields as described above. For example, control circuitry 404 may compute a score of ten for the "Series Title" field but only a score of two for the "Release Year" because control circuitry 404 may determine that the "Series Title" is better at describing the first and the second media asset than the "Release Year".

At 904, control circuitry 404 computes a total score based on summing each of the scores associated with the one or more fields. For example, control circuitry 404 may determine the scores for each of the individual matching metadata fields as described above in relation to 902. Control circuitry 404 may take the score associated with each of the individual fields and may add the score to compute a total score. Following from the previous example, control circuitry 404 may add ten and two for a total score of twelve when the "Series Title" field and a "Release Year" field have matching data.

At 906, control circuitry 404 retrieves a threshold minimum score from memory. For example, control circuitry 404 may retrieve from memory, such as storage 408, or from a remote database, such as media guidance data source 518, a threshold indicating a threshold minimum total score necessary for two media assets to match. For example, control circuitry 404 may retrieve a threshold minimum score of ten. Control circuitry 404 may determine, based on the retrieved threshold, that any media asset pair have a score less than ten does not match, and any media asset pair having a score greater than ten does match.

At 908, control circuitry 404 determines whether the total score is greater than the threshold minimum score. For example, control circuitry 404 may compare the threshold minimum score, retrieved in 906, to the total score computed in 904. When control circuitry 404 determines that the total score is greater than the threshold minimum score, control circuitry 404 proceeds to 910 where control circuitry 404 determines that the first media asset matches the second media asset. Otherwise, control circuitry 404 proceeds to 912 where control circuitry 404 determines that the first media asset does not match the second media asset. Following from the previous example, control circuitry 404 may compare the total score of twelve to the threshold value (e.g., ten) and may determine that the first media asset matches the second media asset because the total score (e.g., twelve) is greater than the threshold minimum score (e.g., ten).

At 910, control circuitry 404 determines that the first media asset matches the second media asset. For example, control circuitry 404 may determine that the first media asset matches the second media asset when the total score, computed using the steps described above, is greater than a threshold minimum total score retrieved by control circuitry 404. In some embodiments, in response to determining that the first media asset matches the second media asset, control circuitry 404 may determine that the user has won the interactive media guidance game.

At 912, control circuitry 404 determines that the first media asset does not match the second media asset. For example, control circuitry 404 may determine that the first media asset does not match the second media asset when the total score is less than the threshold minimum total score. In some embodiments, control circuitry 404 may determine that the user has lost the interactive media guidance came when the in response to determining that the first media asset does not match the second media asset.

It is contemplated that the steps or descriptions of FIG. 9 may be used with any other embodiment of this disclosure. In addition, the descriptions described in relation to the algorithm of FIG. 9 may be done in alternative orders or in parallel to further the purposes of this disclosure. For example, conditional statements and logical evaluations may be performed in any order or in parallel or simultaneously to reduce lag or increase the speed of the system or method. As a further example, in some embodiments, several instances of a variable may be evaluated in parallel, using multiple logical processor threads, or the algorithm may be enhanced by incorporating branch prediction. Furthermore, it should be noted that the process of FIG. 9 may be implemented on a combination of appropriately configured software and hardware, and that any of the devices or equipment discussed in relation to FIGS. 4-5 could be used to implement one or more portions of the process.

Figure 10:
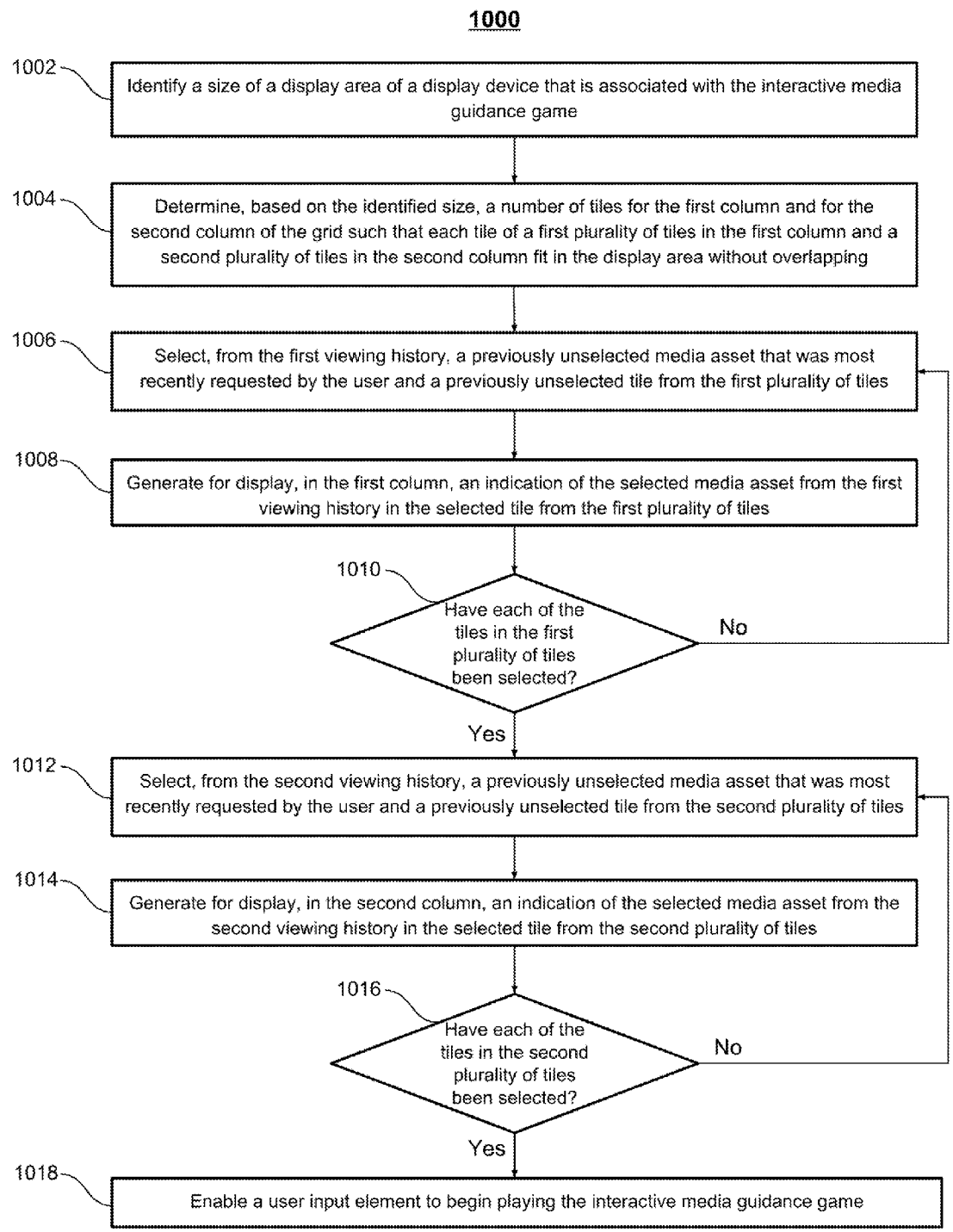
FIG. 10 depicts an illustrative process for generating a grid of the game interface, in accordance with some embodiments of this disclosure.

FIG. 10 is a flowchart of illustrative steps for generating a grid of the game interface, in accordance with some embodiments of the disclosure. For example, a media guidance application implementing process 1000 may be executed by control circuitry 404. In some embodiments, instructions for executing process 1000 may be encoded onto a non-transitory storage medium (e.g., storage 408) as a set of instructions to be decoded and executed by processing circuitry (e.g., processing circuitry 406). Processing circuitry may, in turn, provide instructions to other sub-circuits contained within control circuitry 404, such as the tuning, video generating, encoding, decoding, encrypting, decrypting, scaling, analog/digital conversion circuitry, and the like. It should be noted that process 1000, or any step thereof, could be performed on, or provided by, any of the devices shown in FIGS. 4-5.

Process 1000 begins at 1002 where control circuitry 404 identifies a size of a display area of a display device that is associated with the interactive media guidance game. For example, control circuitry 404 may query hardware connected to control circuitry 404, such a display 412 for a display size (e.g., in pixels) associated with the device. In another example, control circuitry 404 may have the display size stored in memory, such as storage 408, and may retrieve the size from the memory. In some embodiments, the interactive media guidance game may be generated for display on a portion of the display (e.g., display 412). Accordingly, control circuitry 404 may determine an area for the portion of the display occupied by the media guidance game.

At 1004, control circuitry 404 determines, based on the identified size, a number of tiles for the first column and for the second column of the grid such that each tile of a first plurality of tiles in the first column (e.g., first column 104) and a second plurality of tiles in the second column (e.g., second column 106) fit in the display area without overlapping. For example, as described above, control circuitry 404 may determine a size for each of tiles 108, 110, 124 and 126 of the game interface. Based on the size of the single tile in the display area (e.g., in pixels) and the size of the display area (e.g., also in pixels), control circuitry 404 may determine a number of tiles that may be generated for display within the display area without overlapping. Specifically, based on a size of a display area of the display device, control circuitry 404 may determine a number of tiles for the first column (e.g., first column 104) and the second column (e.g., second column 106) of the grid such that each tile of the plurality of tiles in the first column and the second column fit in the display area without overlapping. For example, control circuitry 404 may determine a size for first tile 108 and second tile 110 so that first tile 108 does not overlap with second tile 110 in the display area. Control circuitry 404 may determine, based on the size of first tile 108 and the size of second tile 110 a number of tiles that fit in first column 104 and second column 106.

At 1006, control circuitry 404 selects, from the first viewing history, a previously unselected media asset that was most recently requested by the user and a previously unselected tile from the first plurality of tiles. For example, control circuitry 404 may determine that the first viewing history includes data indicating when each media asset in the first viewing history was selected by the user. Control circuitry 404 may select, based on the data indicating when the respective media asset was selected from the first viewing history, a media asset that was most recently selected by the user for inclusion in the tile in the grid of tiles. For example, as described above, control circuitry 404 may associate tiles in the first column (e.g., first tile 108 and third tile 124) with a first content provider. Control circuitry 404 may generate for display the selected media asset in the selected tile (e.g., first tile 108 or third tile 124).

At 108, control circuitry 404 generates for display, in the first column, an indication of the selected media asset from the first viewing history in the selected tile from the first plurality of tiles. For example, control circuitry 404 may select a media asset from the first viewing history as described above. Control circuitry 404 may generate for display an indication of the selected media asset, such as an image associated with the selected media asset, a title of the selected media asset, metadata associated with the selected media asset, etc. For example, control circuitry 404 may generate for display an image associated with a selected media asset in first tile 108 or third tile 124.

At 1010, control circuitry 404 determines whether each of the tiles in the first plurality of tiles have been selected. For example, control circuitry 404 may determine the number of tiles that fit in the grid of the interactive media guidance game as described above. Control circuitry 404 may populate each of the tiles in the first column of the grid with a media asset from the first viewing history. When control circuitry 404 determines that each of the tiles in the first plurality of tiles have been selected, control circuitry 404 proceeds to 1012 to generate tiles in the second column. Otherwise, control circuitry 404 proceeds to 1106 to select a previously unselected tile from the first plurality of tiles and a media asset from the first viewing history.

At 1012, control circuitry 404 selects from the second viewing history a previously unselected media asset that was most recently requested by the user and a previously unselected tile from the second plurality of tiles. For example, control circuitry 404 may determine, based on the second viewing history, how recently a user has requested a media asset from the second content provider. Based on the determination, control circuitry 404 may select a media asset that was most recently selected by the user from the second content provider. Control circuitry 404 may associate the selected media asset from the second viewing history with the selected tile from the second plurality of tiles (e.g., tiles 110 or 126).

At 1014, control circuitry 404 generates for display, in the second column, an indication of the selected media asset from the second viewing history in the selected tile from the second plurality of tiles. For example, as described above, control circuitry 404 may retrieve metadata associated with the selected media asset, such as a title, genre, image, etc. Control circuitry 404 may generate for display an indication of the selected media asset in the second tile, such as text indicating the title or genre, or the image associated with the selected media asset.

At 1016, control circuitry 404 determines whether each of the tiles in the second plurality of have been selected by control circuitry 404. For example, control circuitry 404 may compare the number of tiles determined at 1004 to a number of tiles in the second plurality of tiles that were selected by control circuitry 404 at 1012, and generated for display at 1014. If control circuitry 404 determines that the number of tiles selected by control circuitry 404 is equal to the number of tiles determined at 1004, control circuitry 404 proceeds to 1018 to generate for display a user input element to begin playing the interactive media guidance game. If control circuitry 404 determines that the number of tiles selected by control circuitry 404 is not equal to the total number of tiles in the second plurality of tiles, control circuitry 404 proceeds to 1012 to select a previously unselected tile from the second plurality of tiles and a previously unselected media asset from the second viewing history.

At 1018, control circuitry 404 enables a user input element to begin playing the interactive media guidance game. For example, control circuitry 404 may generate for display a button associated with commencing playback of the interactive media guidance game. Control circuitry 404 may enable user selection of the displayed button after all of the tiles in the first column an all of the tiles in the second column are generated for display (e.g., on display 308) by control circuitry 404.

It is contemplated that the steps or descriptions of FIG. 10 may be used with any other embodiment of this disclosure. In addition, the descriptions described in relation to the algorithm of FIG. 10 may be done in alternative orders or in parallel to further the purposes of this disclosure. For example, conditional statements and logical evaluations may be performed in any order or in parallel or simultaneously to reduce lag or increase the speed of the system or method. As a further example, in some embodiments, several instances of a variable may be evaluated in parallel, using multiple logical processor threads, or the algorithm may be enhanced by incorporating branch prediction. Furthermore, it should be noted that the process of FIG. 10 may be implemented on a combination of appropriately configured software and hardware, and that any of the devices or equipment discussed in relation to FIGS. 4-5 could be used to implement one or more portions of the process.

Figure 11:
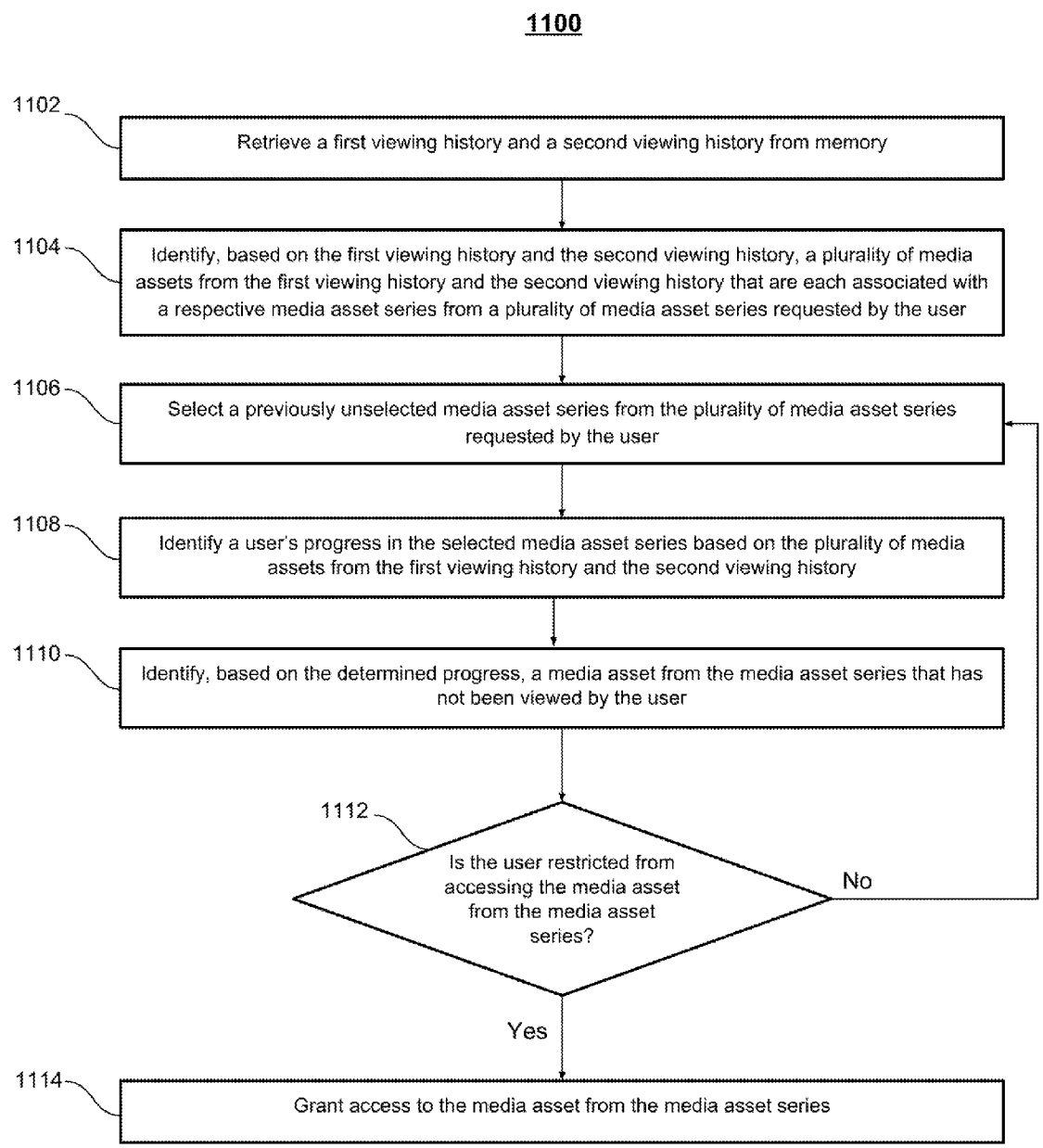
FIG. 11 depicts an illustrative process for identifying a media asset that has not yet been viewed by a user, in accordance with some embodiments of this disclosure.

FIG. 11 is a flowchart of illustrative steps for identifying an episode of a series that has not been viewed by a user for awarding as a prize for winning the interactive media guidance game, in accordance with some embodiments of the disclosure. For example, a media guidance application implementing process 1100 may be executed by control circuitry 404. In some embodiments, instructions for executing process 1100 may be encoded onto a non-transitory storage medium (e.g., storage 408) as a set of instructions to be decoded and executed by processing circuitry (e.g., processing circuitry 406). Processing circuitry may, in turn, provide instructions to other sub-circuits contained within control circuitry 404, such as the tuning, video generating, encoding, decoding, encrypting, decrypting, scaling, analog/digital conversion circuitry, and the like. It should be noted that process 1100, or any step thereof, could be performed on, or provided by, any of the devices shown in FIGS. 4-5.

Process 1100 begins at 1002 where control circuitry 404 retrieves a first viewing history and a second viewing history from memory. For example, control circuitry 404 may first identify a profile of a user of the interactive media guidance game. For example, control circuitry 404 may request login information associated with the user (e.g., username and password, a fingerprint, image of the user, etc.). Based on the login information, control circuitry 404 may retrieve a profile for the user from memory, such as storage 408 or from a remote location, such as media guidance data source 518. Based on retrieving the profile, control circuitry 404 may identify a first content provider and a second content provider to which the user subscribes. For example, control circuitry 404 may determine, based on the profile, that the user subscribes to the first content provider and that the user subscribes to the second content provider. Control circuitry 404 may retrieve from the memory (e.g., locally from storage 408 or remotely from media guidance data source 518) the first viewing history associated with the first content provider and the second viewing history associated with the second content provider.

At step 1104, control circuitry 404 identifies, based on the first viewing history and the second viewing history, a plurality of media assets from the first viewing history and the second viewing history that are each associated with a respective media asset series from a plurality of media asset series requested by the user. For example, control circuitry 404 may retrieve metadata associated with each of the media assets in the first viewing history and the second viewing history and may determine, based on a series data in the metadata, whether the media asset is a part of a series of media assets. For example, control circuitry 404 may determine that the user has viewed a first and a second episode of the television series "Game of Thrones". Control circuitry 404 media asset determine that the first and the second episodes are part of a series of episodes of the series "Game of Thrones" based on detecting a series identifier for the series "Game of Thrones" in the metadata of the first episode and the second episode.

At 1106, control circuitry 404 selects a previously unselected media asset series from the plurality of media asset series requested by the user. For example, control circuitry 404 may identify each media asset from the first and the second viewing history that are associated with a series of media assets. Control circuitry 404 may determine, based on the identified media asset series associated with the media assets of the first and second viewing history, a plurality of media asset series requested by the user. Control circuitry 404 may select a media asset series, from the plurality of media asset series that was requested by the user.

At 1108, control circuitry 404 identify a user's progress in the selected media asset series based on the plurality of media assets from the first viewing history and the second viewing history. For example, control circuitry 404 may identify each of the media assets in the first viewing history and the second viewing history that are associated with the selected media asset series based on metadata associated with each of the media assets (e.g., a series indicator in the metadata of the respective media asset). Control circuitry 404 may compare each of the media assets in the first and the second viewing history that correspond to the media asset series to a sequence of media assets that identify an ordering of media assets in the media asset series. Based on the comparison, control circuitry 404 may identify a position in the media asset series that includes all media assets that have been requested by the user.

At 1110, control circuitry 404 identifies, based on the determined progress, a media asset from the media asset series that has not been viewed by the user. For example, control circuitry 404 may determine that the user has viewed the first and the second episode of "Game of Thrones" as described above. In response to determining that the user has viewed the first and the second episode, control circuitry 404 may retrieve a listing of episodes in the series "Game of Thrones" (e.g., via media guidance data source 518). Control circuitry 404 may compare media assets in the viewing histories of the user to media assets in the retrieved listing of episodes. For example, control circuitry 404 may determine, based on the comparison, that the user has only viewed the first and the second episode of the series "Game of Thrones" out of a total of 60 episodes in the series. Accordingly, control circuitry 404 may determine that a next episode that has not been viewed by the user is the third episode.

At step 1112, control circuitry 404 determines whether the user is restricted form accessing the media asset from the media asset series. For example, control circuitry 404 may determine, based on the user profile, whether the user has a subscription to a media content provider of the third episode of the series. For example, control circuitry 404 may determine content providers to which the user has access based on the profile. Control circuitry 404 may transmit a query to each of the content providers to determine whether any of the content providers provide access to the media asset. If control circuitry 404 determines that none of the content providers to which the user subscribes provides access to the third episode, control circuitry 404 may identify another content provider which does provide access to the third episode. For example, control circuitry 404 may determine that a third content provider provides access to the third episode by querying a database of content available from the third content provider. If control circuitry 404 determines that the user is restricted from accessing the media asset from the media asset series, control circuitry 404 returns to 1106 to select a previously unselected media asset series from the plurality of media asset series requested by the user. If control circuitry 404 determines that the user is restricted from accessing the media asset from the media asset series, control circuitry 404 proceeds to 1114 to grant access to the media asset from the media asset series.

At 1114, control circuitry 404 grants access to the media asset from the media asset series. For example, control circuitry 404 may grant access to the media asset by, for example, requesting the media asset to be downloaded to a device associated with the user. Control circuitry 404 may grant access to the media asset from the media asset series in response to determining that the user has won the interactive media guidance game by matching a first media asset to a second media asset in the grid.

It is contemplated that the steps or descriptions of FIG. 11 may be used with any other embodiment of this disclosure. In addition, the descriptions described in relation to the algorithm of FIG. 11 may be done in alternative orders or in parallel to further the purposes of this disclosure. For example, conditional statements and logical evaluations may be performed in any order or in parallel or simultaneously to reduce lag or increase the speed of the system or method. As a further example, in some embodiments, several instances of a variable may be evaluated in parallel, using multiple logical processor threads, or the algorithm may be enhanced by incorporating branch prediction. Furthermore, it should be noted that the process of FIG. 11 may be implemented on a combination of appropriately configured software and hardware, and that any of the devices or equipment discussed in relation to FIGS. 4-5 could be used to implement one or more portions of the process.

The processes discussed above are intended to be illustrative and not limiting. One skilled in the art would appreciate that the steps of the processes discussed herein may be omitted, modified, combined and/or rearranged, and any additional steps may be performed without departing from the scope of the invention. More generally, the above disclosure is meant to be exemplary and not limiting. Only the claims that follow are meant to set bounds as to what the present invention includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

What is claimed is:

1. A method for providing an interactive media guidance game, the method comprising:
retrieving, from a first content provider, a first viewing history identifying a first plurality of media assets requested by a user from the first content provider;
retrieving, from a second content provider, a second viewing history identifying a second plurality of media assets requested by the user from the second content provider;
generating for display within an electronic media guidance application a plurality of tiles arranged in a grid, wherein each tile in a first column of the grid is associated with a respective media asset of the first plurality of media assets, and wherein each tile in a second column of the grid is associated with a respective media asset of the second plurality of media assets;
receiving a user input to modify the displayed plurality of tiles;
in response to receiving the user input:
selecting, using a selection algorithm, a first media asset from the first plurality of media assets and a second media asset from the second plurality of media assets;
generating for display a first tile associated with the first media asset in the first column of the grid and a second tile associated with the second media asset in the second column of the grid;
retrieving first metadata associated with the first media asset and second metadata associated with the second media asset;
retrieving a first plurality of fields from the first metadata and a second plurality of fields from the second metadata;
comparing, for each field in the first plurality of fields, a field type with a field type of each field in the second plurality fields;
determining, based on the comparing, for each field in the first plurality of fields a corresponding field in the second plurality of fields;
comparing data in each of the first plurality of fields with data in the corresponding field in the second plurality of fields;

determining, based on comparing the data in each of the first plurality of fields with the data in the corresponding field in the second plurality of fields, whether one or more fields in the second plurality of fields match a corresponding field in the first plurality of fields;

determining based on an amount of fields in the second plurality of fields that match a corresponding field in the first plurality of fields, whether the first media asset matches the second media asset;

in response to determining that the first media asset matches the second media asset, generating for display an indication that the first media asset matches the second media asset; and in response to determining that the first media asset does not match the second media asset, generating for display an indication that the first media asset does not match the second media asset.

2. The method of claim 1, wherein retrieving first metadata associated with the first media asset and second metadata associated with the second media asset, further comprises:

generating a first query comprising a first unique identifier for the first media asset and a second query comprising a second unique identifier for the second media asset, wherein the first query and the second query include a request for metadata of the first media asset and the second media asset, respectively;

transmitting the first query to the first content provider and the second query to the second content provider;

receiving a first response from the first content provider comprising the first metadata and a second response from the second content provider comprising the second metadata; and storing the first metadata and the second metadata in memory.

3. The method of claim 1, wherein generating for display an indication that the first media asset matches the second media asset, further comprises:

generating for display data from a field of the first plurality of fields that matches a corresponding field in the second plurality of fields in the first tile; and generating for display data from a field of the second plurality of fields that matches a corresponding field in the first plurality of fields in the second tile.

4. The method of claim 1, further comprising:

in response to determining that the first media asset matches the second media asset:

determining, based on the first viewing history and the second viewing history, that the user has requested a sequence of media assets from a media asset series;

comparing media assets in the sequence of media assets to media assets in the media asset series to identify a media asset from the media asset series that has not been viewed by the user;

determining whether the user is restricted from accessing the media asset from the media asset series; and in response to determining that the user is restricted from accessing the media asset from the media asset series, granting access to the media asset from the media asset series by way of one of the first content provider and the second content provider.

5. The method of claim 4, wherein the sequence of media assets is a first sequence of media assets from a first media asset series, and wherein the media asset from the media asset series is a first media asset from the first media asset series, further comprising:

determining, based on the first viewing history and the second viewing history, that the user has requested a second sequence of media assets from a second media asset series;

comparing media assets in the second sequence of media assets to media assets in the second media asset series to identify a second media asset from the second media asset series that has not been viewed by the user;

determining whether the user is restricted from accessing the second media asset from the second media asset series; and in response to determining that the user is restricted from accessing the second media asset from the second media asset series, generating for display an option to receive access to one of the first media asset from the first media asset series and the second media asset from the second media asset series.

6. The method of claim 4, wherein granting access to the media asset from the media asset series by way of one of the first content provider and the second content provider, further comprises:

generating a query comprising data that uniquely identifies the media asset from the media asset series and uniquely identifies the user;

transmitting the query to the first content provider and to the second content provider;

in response to transmitting the query, receiving data identifying a content provider, of the first content provider and the second content provider, that provides access to the media asset from the media asset series and a criterion associated with removing the access restriction to the media asset from the media asset series; and granting access to the media asset from the media asset series by satisfying the criterion associated with receiving access to the media asset from the media asset series without further user input.

7. The method of claim 1, wherein comparing data in each of the first plurality of fields with data in the corresponding field in the second plurality of fields, further comprises:

determining that a first field of the plurality of fields includes a first plurality of values;

determining that a second field of the second plurality of fields includes a second plurality of values, wherein the second field corresponds to the first field; and determining that the first field matches the second field when each value of the first plurality of values matches a value in the second plurality of values.

8. The method of claim 1, wherein determining that the first media asset matches the second media asset further comprises:

receiving a score associated with each of the one or more fields in the second plurality of fields that match a corresponding field in the first plurality of fields, wherein the score for each of the one or more fields is based on a relevancy of the field in describing the first and the second media asset;

computing a total score based on summing each of the scores associated with the one or more fields;

determining that the first media asset matches the second media asset when the total score is greater than a threshold score; and determining that the first media asset does not match the second media asset when the total score is not greater than the threshold score.

9. The method of claim 1, further comprising:
receiving a user input to modify the displayed plurality of tiles, rereviewing a value corresponding to a number of times that the user is allowed to modify the displayed plurality of tiles;
in response to determining that the value is greater than zero:
modifying the displayed plurality of tiles; and
decrementing the value; and
in response to determining that the value is greater than zero, generating for display an indication that the displayed plurality of tiles cannot be modified.

10. The method of claim 1, further comprising:
determining, based on a size of a display area of the display device, a number of tiles for the first column and the second column of the grid such that each tile of the plurality of tiles in the first column and the second column fit in the display area without overlapping;
selecting, for each respective tile in the first column, a unique respective media asset from the first plurality of media assets that was most recently accessed by the user; and
selecting, for each respective tile in the second column, a unique respective media asset from the second plurality of media assets that was most recently accessed by the user.

11. A system for providing an interactive media guidance game, the system comprising:
communications circuitry; and
control circuitry configured to:
retrieve, using the communications circuitry, from a first content provider, a first viewing history identifying a first plurality of media assets requested by a user from the first content provider;
retrieve, using the communications circuitry, from a second content provider, a second viewing history identifying a second plurality of media assets requested by the user from the second content provider;
generate for display within an electronic media guidance application a plurality of tiles arranged in a grid, wherein each tile in a first column of the grid is associated with a respective media asset of the first plurality of media assets, and wherein each tile in a second column of the grid is associated with a respective media asset of the second plurality of media assets;
receive a user input to modify the displayed plurality of tiles;
in response to receiving the user input:
select, using a selection algorithm, a first media asset from the first plurality of media assets and a second media asset from the second plurality of media assets;
generate for display a first tile associated with the first media asset in the first column of the grid and a second tile associated with the second media asset in the second column of the grid;
retrieve, using the communications circuitry, first metadata associated with the first media asset and second metadata associated with the second media asset;
retrieve a first plurality of fields from the first metadata and a second plurality of fields from the second metadata;
compare, for each field in the first plurality of fields, a field type with a field type of each field in the second plurality fields;
determine, based on the comparing, for each field in the first plurality of fields a corresponding field in the second plurality of fields;
compare data in each of the first plurality of fields with data in the corresponding field in the second plurality of fields;
determine, based on comparing the data in each of the first plurality of fields with the data in the corresponding field in the second plurality of fields, whether one or more fields in the second plurality of fields match a corresponding field in the first plurality of fields;
determine based on an amount of fields in the second plurality of fields that match a corresponding field in the first plurality of fields, whether the first media asset matches the second media asset;
in response to determining that the first media asset matches the second media asset, generate for display an indication that the first media asset matches the second media asset; and
in response to determining that the first media asset does not match the second media asset, generate for display an indication that the first media asset does not match the second media asset.

12. The system of claim 11, wherein the control circuitry is further configured, when retrieving the first metadata associated with the first media asset and second metadata associated with the second media asset, to:
generate a first query comprising a first unique identifier for the first media asset and a second query comprising a second unique identifier for the second media asset, wherein the first query and the second query include a request for metadata of the first media asset and the second media asset, respectively;
transmit the first query to the first content provider and the second query to the second content provider;
receive a first response from the first content provider comprising the first metadata and a second response from the second content provider comprising the second metadata; and
store the first metadata and the second metadata in memory.

13. The system of claim 11, wherein the control circuitry is further configured, when generating for display an indication that the first media asset matches the second media asset, to:
generate for display data from a field of the first plurality of fields that matches a corresponding field in the second plurality of fields in the first tile; and
generate for display data from a field of the second plurality of fields that matches a corresponding field in the first plurality of fields in the second tile.

14. The system of claim 11, wherein the control circuitry is further configured, in response to determining that the first media asset matches the second media asset, to:
determine, based on the first viewing history and the second viewing history, that the user has requested a sequence of media assets from a media asset series;
compare media assets in the sequence of media assets to media assets in the media asset series to identify a media asset from the media asset series that has not been viewed by the user;
determine whether the user is restricted from accessing the media asset from the media asset series; and
in response to determining that the user is restricted from accessing the media asset from the media asset series, grant access to the media asset from the media asset series by way of one of the first content provider and the second content provider.

15. The system of claim 14, wherein the sequence of media assets is a first sequence of media assets from a first media asset series, and wherein the media asset from the media asset series is a first media asset from the first media asset series, and wherein the control circuitry is further configured to:
- determine, based on the first viewing history and the second viewing history, that the user has requested a second sequence of media assets from a second media asset series;
- compare media assets in the second sequence of media assets to media assets in the second media asset series to identify a second media asset from the second media asset series that has not been viewed by the user;
- determine whether the user is restricted from accessing the second media asset from the second media asset series; and
- in response to determining that the user is restricted from accessing the second media asset from the second media asset series, generate for display an option to receive access to one of the first media asset from the first media asset series and the second media asset from the second media asset series.

16. The system of claim 14, wherein the control circuitry is further configured, when granting access to the media asset from the media asset series by way of one of the first content provider and the second content provider, to:
- generate a query comprising data that uniquely identifies the media asset from the media asset series and uniquely identifies the user;
- transmit the query to the first content provider and to the second content provider;
- in response to transmitting the query, receive data identifying a content provider, of the first content provider and the second content provider, that provides access to the media asset from the media asset series and a criterion associated with removing the access restriction to the media asset from the media asset series; and
- grant access to the media asset from the media asset series by satisfying the criterion associated with receiving access to the media asset from the media asset series without further user input.

17. The system of claim 11, wherein the control circuitry is further configured, when comparing data in each of the first plurality of fields with data in the corresponding field in the second plurality of fields, to:
- determine that a first field of the plurality of fields includes a first plurality of values;
- determine that a second field of the second plurality of fields includes a second plurality of values, wherein the second field corresponds to the first field; and
- determine that the first field matches the second field when each value of the first plurality of values matches a value in the second plurality of values.

18. The system of claim 11, wherein the control circuitry is further configured, when determining that the first media asset matches the second media asset, to:
- receive a score associated with each of the one or more fields in the second plurality of fields that match a corresponding field in the first plurality of fields, wherein the score for each of the one or more fields is based on a relevancy of the field in describing the first and the second media asset;
- compute a total score based on summing each of the scores associated with the one or more fields;
- determine that the first media asset matches the second media asset when the total score is greater than a threshold score; and
- determine that the first media asset does not match the second media asset when the total score is not greater than the threshold score.

19. The system of claim 11, wherein the control circuitry is further configured to:
- receive a user input to modify the displayed plurality of tiles, rereviewing a value corresponding to a number of times that the user is allowed to modify the displayed plurality of tiles;
- in response to determining that the value is greater than zero:
- modify the displayed plurality of tiles; and
- decrement the value; and
- in response to determining that the value is greater than zero, generate for display an indication that the displayed plurality of tiles cannot be modified.

20. The system of claim 11, wherein the control circuitry is further configured to:
- determine, based on a size of a display area of the display device, a number of tiles for the first column and the second column of the grid such that each tile of the plurality of tiles in the first column and the second column fit in the display area without overlapping;
- select, for each respective tile in the first column, a unique respective media asset from the first plurality of media assets that was most recently accessed by the user; and
- select, for each respective tile in the second column, a unique respective media asset from the second plurality of media assets that was most recently accessed by the user.

* * * * *